US012213196B2

(12) United States Patent
Gu et al.

(10) Patent No.: US 12,213,196 B2
(45) Date of Patent: Jan. 28, 2025

(54) BLUETOOTH COMMUNICATION SYSTEM AND RELATED COMPUTER PROGRAM PRODUCT CAPABLE OF REDUCING COMPLEXITY OF PAIRING BLUETOOTH HOST DEVICE WITH BLUETOOTH DEVICE SET FOR USER

(71) Applicant: Realtek Semiconductor Corp., Hsinchu (TW)

(72) Inventors: Qing Gu, Suzhou (CN); Bi Wei, Suzhou (CN); Yu Hsuan Liu, Hsinchu (TW); Yung Chieh Lin, Hsinchu (TW); Cheng Cai, Suzhou (CN); Sixian Wang, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 346 days.

(21) Appl. No.: 17/668,009

(22) Filed: Feb. 9, 2022

(65) Prior Publication Data
US 2022/0256633 A1    Aug. 11, 2022

(30) Foreign Application Priority Data

Feb. 9, 2021  (CN) .......................... 202110179250.6

(51) Int. Cl.
*H04W 76/15* (2018.01)
*H04W 4/80* (2018.01)
*H04W 76/14* (2018.01)

(52) U.S. Cl.
CPC ............. *H04W 76/15* (2018.02); *H04W 4/80* (2018.02); *H04W 76/14* (2018.02)

(58) Field of Classification Search
CPC ....... H04W 76/15; H04W 4/80; H04W 76/14; H04W 84/18; H04W 4/23; H04W 8/005
See application file for complete search history.

(56) References Cited

U.S. PATENT DOCUMENTS

2013/0018975 A1   1/2013  Higgins
2015/0296329 A1  10/2015  Mao et al.
(Continued)

FOREIGN PATENT DOCUMENTS

CN   103650553 A   3/2014
CN   105099519 A  11/2015
(Continued)

OTHER PUBLICATIONS

Taiwanese Office Action and Search Report for Taiwanese Application No. 111104815, dated Apr. 18, 2022, with English translation.
U.S. Office Action for U.S. Appl. No. 17/668,044, dated Dec. 27, 2023.
Taiwanese Notice of Allowance dated Jun. 21, 2023 for Application No. 111104815 with an English translation.
(Continued)

*Primary Examiner* — Eric Myers
(74) *Attorney, Agent, or Firm* — Birch, Stewart, Kolasch & Birch, LLP

(57) ABSTRACT

A Bluetooth communication system includes: a Bluetooth host device; and a Bluetooth device set which including a first member device and a second member device. The first member device is arranged to operably transmit a first device information corresponding to the first member device and a second device information corresponding to the second member device to the Bluetooth host device. The Bluetooth host device is arranged to operably receive the first device information and the second device information transmitted from the first member device. The Bluetooth host device is further arranged to operably establish a Bluetooth connection with the first member device and conduct pairing procedure with the first member device after receiving a selection command.

8 Claims, 11 Drawing Sheets

(56) References Cited

U.S. PATENT DOCUMENTS

| | | |
|---|---|---|
| 2015/0359022 A1 | 12/2015 | Lau et al. |
| 2015/0373179 A1 | 12/2015 | Davis |
| 2018/0359691 A1 | 12/2018 | Young |
| 2020/0322788 A1 | 10/2020 | Batra et al. |
| 2022/0201453 A1 | 6/2022 | Liu et al. |
| 2022/0408505 A1* | 12/2022 | Zhu ........................ H04W 4/80 |
| 2024/0114281 A1* | 4/2024 | Fang ....................... G06F 3/165 |

FOREIGN PATENT DOCUMENTS

| | | |
|---|---|---|
| CN | 105471481 A | 4/2018 |
| CN | 110191450 A | 8/2019 |
| WO | WO 2021/043286 A1 | 3/2021 |

OTHER PUBLICATIONS

Taiwanese Office Action and Search Report for Taiwanese Application No. 111104814, dated Oct. 4, 2022, with an English translation.
Taiwanese Office Action and Search Report for Taiwanese Application No. 111104816, dated May 19, 2022, with English translation.
U.S. Office Action for U.S. Appl. No. 17/667,678, dated Jun. 4, 2024.
Chinese Office Action and Search Report for Chinese Application No. 202210123182.6, dated Sep. 27, 2024, with a partial English translation.

* cited by examiner

BLUETOOTH COMMUNICATION SYSTEM AND RELATED COMPUTER PROGRAM PRODUCT CAPABLE OF REDUCING COMPLEXITY OF PAIRING BLUETOOTH HOST DEVICE WITH BLUETOOTH DEVICE SET FOR USER

CROSS-REFERENCE TO RELATED APPLICATIONS

This application claims the benefit of priority to Patent Application No. 202110179250.6, filed in China on Feb. 9, 2021; the entirety of which is incorporated herein by reference for all purposes.

BACKGROUND

The disclosure generally relates to Bluetooth technologies and, more particularly, to a Bluetooth communication system and a related computer program product capable of reducing complexity of pairing Bluetooth host device with Bluetooth device set for the user.

There are two categories of Bluetooth technologies: Classic Bluetooth/Legacy Bluetooth technology and BLE (Bluetooth Low Energy) technology. The BLE technology is incompatible (or not completely compatible) with the Classic Bluetooth/Legacy Bluetooth technology, but the two technologies can coexist in the same Bluetooth device or the same Bluetooth chip. In other words, a single Bluetooth device or a single Bluetooth chip may be designed to support both the BLE technology and the Classic Bluetooth/Legacy Bluetooth technology, or may be designed to support only one category of the Bluetooth communication standards. The newly launched Bluetooth LE Audio (BLE Audio) technology (hereinafter referred to as the BLE Audio technology) based on Bluetooth Core Specification Version 5.2 is a significant update to the technical specifications of audio transmission over the past twenty years of development of Bluetooth technologies. The main advantage of the BLE Audio technology is that the BLE Audio technology can transmit audio with higher quality while significantly reducing power consumption. It is foreseeable that the market demand for Bluetooth device set (e.g., a pair of Bluetooth earphones, a group of multi-channel Bluetooth speakers, or the like) that can support the BLE Audio technology will become higher and higher.

As is well known in related art, when a Bluetooth device set which adopts the Classic Bluetooth/Legacy Bluetooth technology connects to a Bluetooth host device (e.g., a cell phone, a computer, or the like), the Bluetooth host device treats multiple member devices in the Bluetooth device set as a single Bluetooth device. Therefore, the Bluetooth host device only needs to establish a connection with one of the multiple member devices in the Bluetooth device set.

However, according to specification of the BLE Audio technology, if an user wants to transmit audio data that meets relevant specifications of BLE audio technology between a Bluetooth device set and a Bluetooth host device that support BLE audio technology, the user must first conduct Bluetooth pairing between the Bluetooth host device and respective member devices in the Bluetooth device set one by one. Thus, the user needs to select the pairing target for multiple times so as to complete the Bluetooth pairing between the Bluetooth host device and all member devices in the Bluetooth device set. Apparently, such pairing mechanism is not only inconvenient to use, but also likely to cause confusion for the user during manipulations.

SUMMARY

An example embodiment of a Bluetooth communication system is disclosed, comprising: a Bluetooth host device, comprising: a host-side communication circuit; a storage circuit, arranged to operably store a Bluetooth pairing program; and a processing circuit, coupled with the host-side communication circuit and the storage circuit, and arranged to operably execute the Bluetooth pairing program in the storage circuit to generate a first graphical user interface, and arranged to operably control a display device to display the first graphical user interface; and a Bluetooth device set, comprising at least a first member device and a second member device; wherein the first member device comprises: a first communication circuit, arranged to operably conduct wireless communications with the host-side communication circuit; and a first control circuit, coupled with the first communication circuit, and arranged to operably utilize the first communication circuit to transmit a first device information corresponding to the first member device to the Bluetooth host device; wherein the second member device comprises: a second communication circuit, arranged to operably conduct wireless communications with the host-side communication circuit; and a second control circuit, coupled with the second communication circuit, and arranged to operably utilize the second communication circuit to transmit a second device information corresponding to the second member device to the Bluetooth host device; wherein the host-side communication circuit is further arranged to operably receive the first device information and the second device information; wherein the processing circuit is further arranged to operably control the display device to simultaneously display a first device item for representing the first member device and a second device item for representing the second member device in the first graphical user interface after the host-side communication circuit receives the first device information and the second device information; wherein the processing circuit is further arranged to operably utilize the host-side communication circuit to establish a Bluetooth connection and conduct a pairing procedure with the first member device after receiving a selection command corresponding to the first device item.

An example embodiment of a computer program product is disclosed. The computer program product is stored in a storage circuit in a Bluetooth host device, and enables the Bluetooth host device to conduct a Bluetooth pairing operation. The Bluetooth pairing operation comprises: generating a first graphical user interface, and controlling a display device to display the first graphical user interface; utilizing a host-side communication circuit to receive a first device information corresponding to the first member device transmitted from a first member device; utilizing the host-side communication circuit to receive a second device information corresponding to a second member device transmitted from the second member device; controlling the display device to simultaneously display a first device item for representing the first member device and a second device item for representing the second member device in the first graphical user interface after receiving the first device information and the second device information; and utilizing the host-side communication circuit to establish a Bluetooth connection and conduct a pairing procedure with the first member device after receiving a selection command corresponding to first device item.

Another example embodiment of a Bluetooth communication system is disclosed, comprising: a Bluetooth host device, comprising: a host-side communication circuit; a storage circuit, arranged to operably store a Bluetooth pairing program; and a processing circuit, coupled with the host-side communication circuit and the storage circuit, and arranged to operably execute the Bluetooth pairing program in the storage circuit to generate a first graphical user interface, and arranged to operably control a display device to display the first graphical user interface; and a Bluetooth device set, comprising at least a first member device and a second member device; wherein the first member device comprises: a first communication circuit, arranged to operably conduct wireless communications with the host-side communication circuit; and a first control circuit, coupled with the first communication circuit, and arranged to operably utilize the first communication circuit to transmit a first device information corresponding to the first member device and a second device information corresponding to the second member device to the Bluetooth host device; wherein the second member device comprises: a second communication circuit, arranged to operably conduct wireless communications with the host-side communication circuit; and a second control circuit, coupled with the second communication circuit, and arranged to operably control operations of the second communication circuit; wherein the host-side communication circuit is further arranged to operably receive the first device information and the second device information transmitted from the first member device; wherein the processing circuit is further arranged to operably utilize the host-side communication circuit to establish a Bluetooth connection and conduct a pairing procedure with the first member device after receiving a selection command.

Another example embodiment of a computer program product is disclosed. The computer program product is stored in a storage circuit in a Bluetooth host device, and enables the Bluetooth host device to conduct a Bluetooth pairing operation. The Bluetooth pairing operation comprises: generating a first graphical user interface, and controlling a display device to display the first graphical user interface; utilizing a host-side communication circuit to receive a first device information corresponding to the first member device and a second device information corresponding to a second member device transmitted from a first member device; and utilizing the host-side communication circuit to establish a Bluetooth connection and conduct a pairing procedure with the first member device after receiving a selection command.

Another example embodiment of a Bluetooth communication system is disclosed, comprising: a Bluetooth host device, comprising: a host-side communication circuit; a storage circuit, arranged to operably store a Bluetooth pairing program; and a processing circuit, coupled with the host-side communication circuit and the storage circuit, and arranged to operably execute the Bluetooth pairing program in the storage circuit to generate a first graphical user interface, and arranged to operably control a display device to display the first graphical user interface; and a Bluetooth device set, comprising at least a first member device and a second member device; wherein the first member device comprises: a first communication circuit, arranged to operably conduct wireless communications with the host-side communication circuit; and a first control circuit, coupled with the first communication circuit, and arranged to operably utilize the first communication circuit to transmit an auto-pair request, a first device information corresponding to the first member device, and a second device information corresponding to the second member device to the Bluetooth host device; wherein the second member device comprises: a second communication circuit, arranged to operably conduct wireless communications with the host-side communication circuit; and a second control circuit, coupled with the second communication circuit, and arranged to operably control operations of the second communication circuit; wherein the host-side communication circuit is further arranged to operably receive the auto-pair request, the first device information, and the second device information transmitted from the first member device; wherein the processing circuit is further arranged to operably utilize the host-side communication circuit to automatically establish a Bluetooth connection and conduct a pairing procedure with the first member device according to the auto-pair request.

Another example embodiment of a computer program product is disclosed. The computer program product is stored in a storage circuit in a Bluetooth host device, and enables the Bluetooth host device to conduct a Bluetooth pairing operation. The Bluetooth pairing operation comprises: generating a first graphical user interface, and controlling a display device to display the first graphical user interface; utilizing a host-side communication circuit to receive an auto-pair request, a first device information corresponding to a first member device, and a second device information corresponding to a second member device transmitted from the first member device; and utilizing the host-side communication circuit to automatically establish a Bluetooth connection and conduct a pairing procedure with the first member device according to the auto-pair request.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
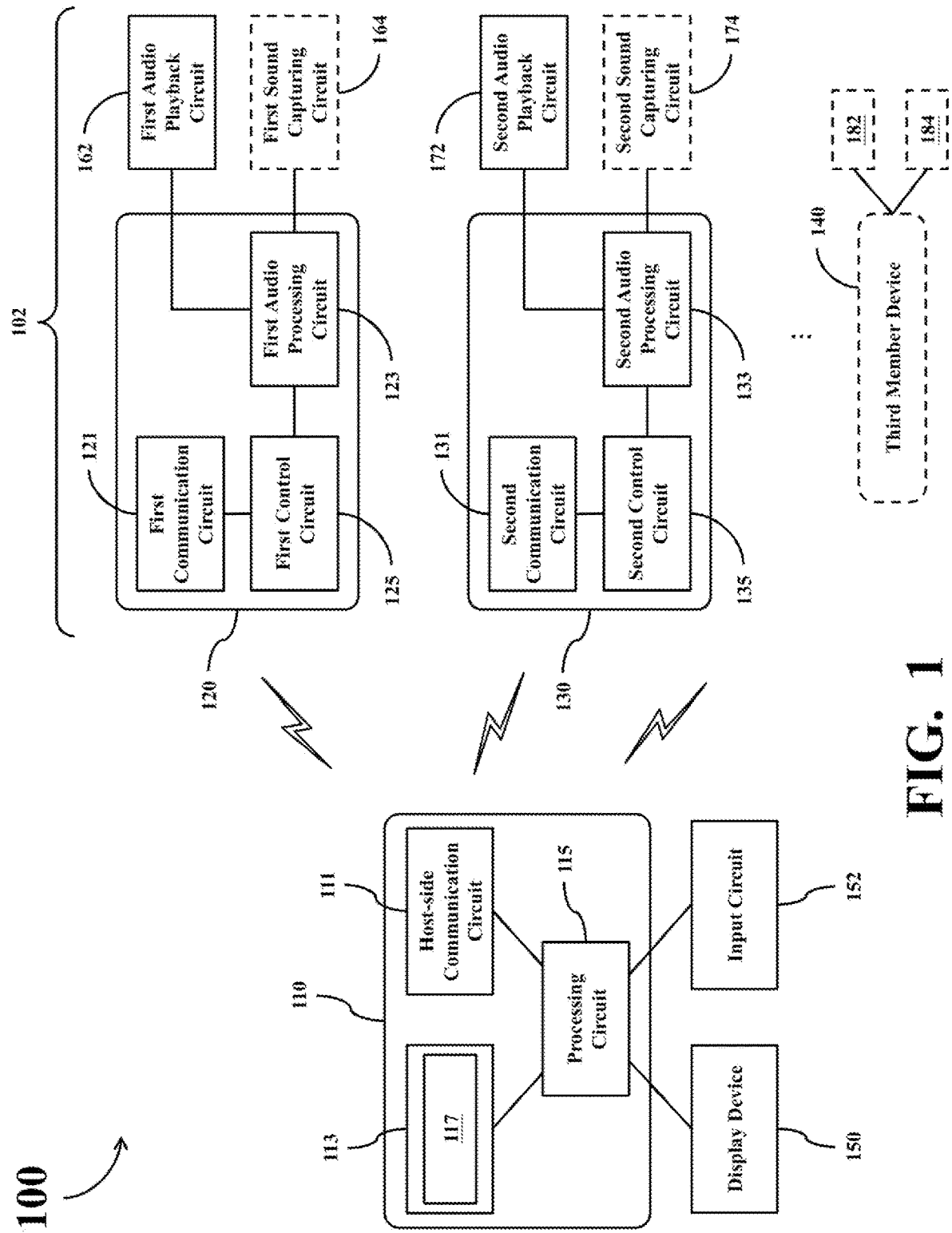
FIG. 1 shows a simplified functional block diagram of a Bluetooth communication system according to one embodiment of the present disclosure.

FIG. 1 shows a simplified functional block diagram of a Bluetooth communication system 100 according to one embodiment of the present disclosure. The Bluetooth communication system 100 comprises a Bluetooth host device 110 and a Bluetooth device set 102, wherein the Bluetooth device set 102 comprises a plurality of member devices.

In practical applications, the plurality of member devices in the Bluetooth device set 102 may utilize various approaches complying with the Bluetooth communication standards to create a Bluetooth piconet, and may conduct various instruction transmission or data transmission through the Bluetooth piconet. Alternatively, the plurality of member devices in the Bluetooth device set 102 may collectively form a coordinate set complying with various Bluetooth communication standards.

In this embodiment, the Bluetooth host device 110 and all member devices in the Bluetooth device set 102 support the Bluetooth LE Audio (BLE Audio) technology (hereinafter referred to as BLE Audio technology) specified by the Bluetooth Core Specification Version 5.2 or newer versions. Accordingly, an user may connect the Bluetooth host device 110 with the Bluetooth device set 102 to utilize the Bluetooth device set 102 to conduct various audio playback operations.

For example, two member devices in the Bluetooth device set 102 may cooperate with appropriate audio playback circuits to collectively form a pair of Bluetooth earphones or a 2.0 channel speaker set. For another example, three member devices in the Bluetooth device set 102 may cooperate with appropriate audio playback circuits to collectively form a 2.1 channel speaker set. For another example, sis member devices in the Bluetooth device set 102 may cooperate with appropriate audio playback circuits to collectively form a 5.1 channel speaker set. For another example, eight member devices in the Bluetooth device set 102 may cooperate with appropriate audio playback circuits to collectively form a 7.1 channel speaker set.

In order to reduce the complexity of the drawing, only three exemplary member devices are shown in FIG. 1, which are a first member device 120, a second member device 130, and a third member device 140. In the embodiment of FIG. 1, the first member device 120 is coupled with a first audio playback circuit 162 and a first sound capturing circuit 164; the second member device 130 is coupled with a second audio playback circuit 172 and a second sound capturing circuit 174; while the third member device 140 is coupled with a third audio playback circuit 182 and a third sound capturing circuit 184.

After the Bluetooth host device 110 complete the pairing procedure with the first member device 120, the second member device 130, and the third member device 140 in the Bluetooth device set 102, the Bluetooth host device 110 may utilize above member devices to control related audio playback circuits to playback audio data transmitted from the Bluetooth host device 110 by adopting the BLE Audio technology.

In the embodiment of FIG. 1, the Bluetooth host device 110 comprises a host-side communication circuit 111, a storage circuit 113, and a processing circuit 115. The first member device 120 comprises a first communication circuit 121, a first audio processing circuit 123, and a first control circuit 125. The second member device 130 comprises a second communication circuit 131, a second audio processing circuit 133, and a second control circuit 135.

In the Bluetooth host device 110, the host-side communication circuit 111 is arranged to operably receive and transmit various Bluetooth packets. The storage circuit 113 is arranged to operably store a Bluetooth pairing program 117. The processing circuit 115 is coupled with the host-side communication circuit 111 and the storage circuit 113, and is arranged to operably generate various Bluetooth packets to be transmitted by the host-side communication circuit 111, and to operably parse various Bluetooth packets received by the host-side communication circuit 111 to obtain related data or instructions. The processing circuit 115 is further arranged to operably execute the Bluetooth pairing program 117 in the storage circuit 113 to conduct a Bluetooth pairing operation. In some embodiments, the processing circuit 115 is further arranged to operably execute selected or predetermined cypher key algorithms to generate cypher keys required by the Bluetooth host device 110 for conducting subsequent Bluetooth data transmissions with respective member devices in the Bluetooth device set 102.

The term "Bluetooth packet" used throughout the description and the claims also encompass various protocol data units (PDUs) specified by various Bluetooth communication standards.

In some embodiments, the processing circuit 115 is further coupled with a display device 150 and an input circuit 152. The processing circuit 115 is arranged to operably control operations of the display device 150, so as to display related information, images and/or graphical user interface (GUI) to the user. The input circuit 152 is arranged to operably receive various commands issued by the user, and the processing circuit 115 is arranged to operably control operations of the Bluetooth host device 110 according to various operating commands issued by the user through the input circuit 152.

In the first member device 120, the first communication circuit 121 is arranged to operably receive and transmit various Bluetooth packets. The first control circuit 125 is coupled with the first communication circuit 121 and the first audio processing circuit 123. The first control circuit 125 is arranged to operably generate various Bluetooth packets to be transmitted by the first communication circuit 121, and is arranged to operably parse various Bluetooth packets received by the first communication circuit 121 to obtain related data or instructions. The first control circuit 125 is further arranged to operably execute selected or predetermined cypher key algorithms to generate cypher keys required by the first member device 120 for conducting subsequent Bluetooth data transmissions with the Bluetooth host device 110. In some embodiments, the first control circuit 125 is further arranged to operably adjust the clock signals employed by the first member device 120, so as to synchronize a piconet clock utilized among the first member device 120 and other Bluetooth devices.

The first audio processing circuit 123 is coupled with the first control circuit 125, the first audio playback circuit 162, and the first sound capturing circuit 164. The first audio processing circuit 123 is arranged to operably process the audio data transmitted from the Bluetooth host device 110

(e.g., to encode or decode the audio data, and/or to conduct format conversion on the audio data) according to the instructions of the first control circuit 125, and is arranged to operably control the first audio playback circuit 162 to playback contents of the audio data. The first audio processing circuit 123 is further arranged to operably encode the sounds received by the first sound capturing circuit 164 to generate related sound data.

In the second member device 130, the second communication circuit 131 is arranged to operably receive and transmit various Bluetooth packets. The second control circuit 135 is coupled with the second communication circuit 131 and the second audio processing circuit 133. The second control circuit 135 is arranged to operably generate various Bluetooth packets to be transmitted by the second communication circuit 131, and arranged to operably parse various Bluetooth packets received by the second communication circuit 131 to acquire related data or instructions. The second control circuit 135 is further arranged to operably execute various selected or predetermined cypher key algorithms to generate cypher keys required by the second member device 130 for conducting subsequent Bluetooth data transmissions with the Bluetooth host device 110. In some embodiments, the second control circuit 135 is further arranged to operably adjust the clock signals employed by the second member device 130, so as to synchronize a piconet clock utilized among the second member device 130 and other Bluetooth devices.

The second audio processing circuit 133 is coupled with the second control circuit 135, the second audio playback circuit 172, and the second sound capturing circuit 174. The second audio processing circuit 133 is arranged to operably process the audio data transmitted from the Bluetooth host device 110 (e.g., to encode or decode the audio data, and/or to conduct format conversion on the audio data) according to the instructions of the second control circuit 135, and is arranged to operably control the second audio playback circuit 172 to playback contents of the audio data. The second audio processing circuit 133 is further arranged to operably encode the sounds received by the second sound capturing circuit 174 to generate related sound data.

In this embodiment, each of the Bluetooth host device 110, the first member device 120, and the second member device 130 supports the BLE Audio technology. In this situation, the processing circuit 115 of the Bluetooth host device 110 is further arranged to operably generate audio data complying with related specifications of the BLE Audio technology (hereinafter referred to as BLE audio data), and to operably utilize the host-side communication circuit 111 to transmit the BLE audio data to all member devices in the Bluetooth device set 102. The first control circuit 125 of the first member device 120 is further arranged to operably utilize the first audio processing circuit 123 to process the BLE audio data transmitted from the Bluetooth host device 110, and to operably instruct the first audio processing circuit 123 to control the first audio playback circuit 162 to playback the contents of the BLE audio data. Similarly, the second control circuit 135 of the second member device 130 is further arranged to operably utilize the second audio processing circuit 133 to process the BLE audio data transmitted from the Bluetooth host device 110, and to operably instruct the second audio processing circuit 133 to control the second audio playback circuit 172 to playback the contents of the BLE audio data.

In practice, the host-side communication circuit 111 in the aforementioned Bluetooth host device 110 may be realized with appropriate wireless transceiver circuits supporting the Bluetooth communication protocol of the Bluetooth Core Specification Version 5.2 or a newer version. If needed, the host-side communication circuit 111 may be coupled with an additional antenna (not shown in figures).

The storage circuit 113 may be realized with various appropriate volatile storage circuit or non-volatile storage circuit.

The processing circuit 115 may be realized with an appropriate packet demodulation circuit, a digital computing circuit, a microprocessor, an Application Specific Integrated Circuit (ASIC), a single processor module, a combination of multiple processor modules, a single computer system, a combination of multiple computer systems, a single server, a combination of multiple servers, or a cloud computing system having appropriate computing capabilities and capable of parsing and generating Bluetooth packets adopting the BLE Audio technology specified by the Bluetooth Core Specification Version 5.2 or newer versions.

In practical applications, different functional blocks of the aforementioned Bluetooth host device 110 may be realized with separate circuits or may be integrated into a single IC chip or a single device. For example, the host-side communication circuit 111 may be integrated into the processing circuit 115.

Alternatively, all functional blocks of the Bluetooth host device 110 may be integrated into a single IC chip, a mobile communication device (e.g., a cell phone), a wearable device, a tablet computer, a notebook computer, a desktop computer, an audio broadcast system, a voice guidance system, a voice broadcasting system, a vehicular communication device, a satellite communication device, a smart TV, a Bluetooth smart speaker, or the like.

The input circuit 152 may be realized with various appropriate circuits capable of receiving the commands issued by the user, such as a keyboard, a mouse, a touch screen, a voice activated device, a gesture sensing device, or a hybrid of the above various devices. In some embodiments, the input circuit 152 and the display device 150 may be integrated to be a touch screen. In some embodiments, the input circuit 152 and/or the display device 150 may be integrated into the Bluetooth host device 110.

In practice, each of the first communication circuit 121 and the second communication circuit 131 in the aforementioned Bluetooth device set 102 may be realized with an appropriate Bluetooth communication circuit capable of supporting the Bluetooth communication protocol of the Bluetooth Core Specification Version 5.2 or newer versions. If needed, the first communication circuit 121 and the second communication circuit 131 may be respectively coupled with additional antennas (not shown in figures).

Each of the first audio processing circuit 123 and the second audio processing circuit 133 may be realized with a digital computing circuit, a microprocessor, an ASIC, or a digital-to-analog converter (DAC) capable of conducting various encoding/decoding processing and/or data format conversion on audio data.

Each of the first control circuit 125 and the second control circuit 135 may be realized with a packet demodulation circuit, a digital computing circuit, a microprocessor, a single processor module, a combination of multiple processor modules, or an ASIC having appropriate computing capabilities and capable of parsing and generating Bluetooth packets adopting the BLE Audio technology specified by the Bluetooth Core Specification Version 5.2 or newer versions.

In some embodiments, the aforementioned first communication circuit 121 and the second communication circuit 131 may be realized with appropriate Bluetooth transmission circuits that also support the Bluetooth communication protocol of earlier Bluetooth versions (e.g., Bluetooth 2.0, Bluetooth 3.0, Bluetooth 4.0, Bluetooth 4.2, or the like). In this situation, the aforementioned first control circuit 125 and second control circuit 135 should be designed to be able to parse and generate Bluetooth packets defined by the Bluetooth communication protocol of earlier Bluetooth versions.

In some embodiments, the aforementioned first audio processing circuit 123 and second audio processing circuit 133 may be respectively integrated into the aforementioned first control circuit 125 and second control circuit 135.

Different functional blocks of the aforementioned first member device 120 may be realized with separate circuits or may be integrated into a single IC chip, a single wearable Bluetooth device, or a single Bluetooth speaker.

Similarly, different functional blocks of the aforementioned second member device 130 may be realized with separate circuits or may be integrated into a single IC chip, a single wearable Bluetooth device, or a single Bluetooth speaker.

In addition, the first audio playback circuit 162 and the second audio playback circuit 172 may be realized with various appropriate circuits capable of receiving and playbacking audio data, such as various types of speakers. The first sound capturing circuit 164 and the second sound capturing circuit 174 may be realized with various appropriate circuits capable of receiving sound and converting sound into corresponding audio signals, such as various types of microphones.

In some embodiments, the first member device 120, the first audio playback circuit 162, and the first sound capturing circuit 164 may be integrated into a single device (e.g., a wearable Bluetooth device or a Bluetooth speaker). Similarly, the second member device 130, the second audio playback circuit 172, and the second sound capturing circuit 174 may be integrated into a single device (e.g., a wearable Bluetooth device or a Bluetooth speaker).

The main circuit structure and implementations of other member devices (e.g., the third member device 140), other audio playback circuits (e.g., the third audio playback circuit 182), and other sound capturing circuits (e.g., the third sound capturing circuit 184) in the Bluetooth device set 102, may be similar to the aforementioned corresponding member devices/corresponding circuits. But different additional circuit components may be provided in different member devices, different audio playback circuits, and/or different sound capturing circuits. The circuit structure of all member devices is not required to be exactly identical with each other. The circuit structure of all audio playback circuits is not required to be exactly identical with each other. The circuit structure of all sound capturing circuits is not required to be exactly identical with each other.

Figure 2:
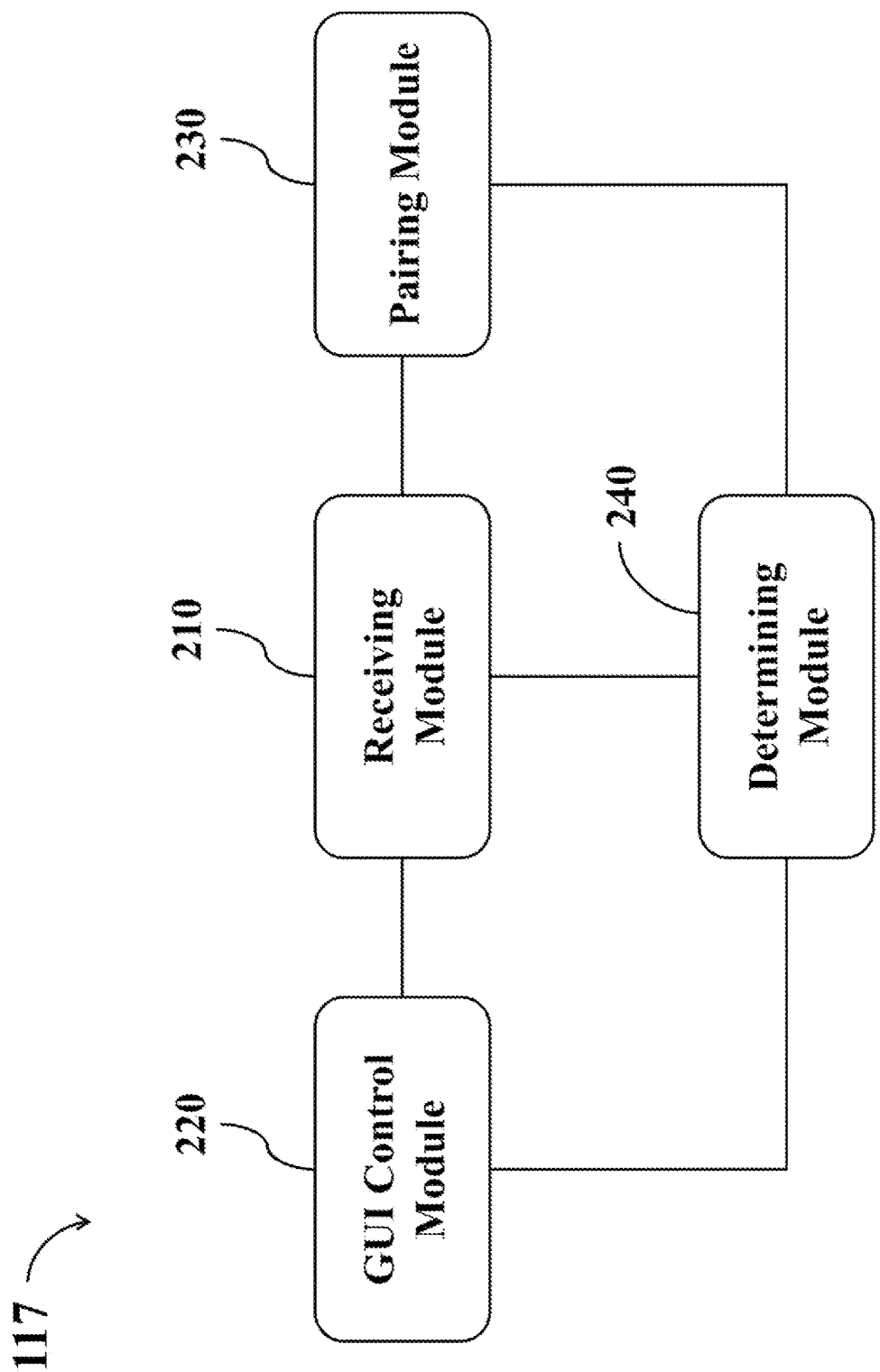
FIG. 2 shows a simplified functional module diagram of a Bluetooth pairing program in the Bluetooth host device of FIG. 1 according to one embodiment of the present disclosure.

The Bluetooth pairing program 117 in the aforementioned Bluetooth host device 110 may be realized with computer program products consisting of one or more functional modules. For example, FIG. 2 shows a simplified functional module diagram of the Bluetooth pairing program 117 in the Bluetooth host device 110 according to one embodiment of the present disclosure. In this embodiment, the Bluetooth pairing program 117 comprises a receiving module 210, a GUI control module 220, a pairing module 230, and a determining module 240.

When the Bluetooth host device 110 and the member devices in the Bluetooth device set 102 support the BLE Audio technology, the user may utilize the Bluetooth communication system 100 to conduct various audio playback operations adopting the BLE Audio technology to reduce the power consumption of the Bluetooth communication system 100 while improving the overall audio playback quality.

As described previously, if an user wants to transmit audio data complying with related specifications of the BLE Audio technology between Bluetooth device set and the Bluetooth host device that support the BLE Audio technology, the user must conduct Bluetooth pairing operation between the traditional Bluetooth host device and respective member devices of the traditional Bluetooth device set one by one. That is, the user has to select one of the member devices in the Bluetooth device set to conduct Bluetooth pairing with the traditional Bluetooth host device first. After the aforementioned Bluetooth pairing is completed, the user needs to select the next member device in the traditional Bluetooth device set to conduct Bluetooth pairing with the traditional Bluetooth host device, and then repeats the above selection procedure until all member devices in the Bluetooth device set are completely paired with the traditional Bluetooth host device.

Apparently, the user has to perform a plurality of device selection actions to complete the Bluetooth pairing between the traditional Bluetooth host device and all the member devices in the traditional Bluetooth device set. Therefore, the traditional Bluetooth device pairing method is not only inconvenient for the user to use, but also easily causes the user to be confused during the manipulation and make mistakes.

In order to reduce the complexity when the user pairs the Bluetooth host device and the Bluetooth device set, the Bluetooth host device 110 and the Bluetooth device set 102 in the disclosed Bluetooth communication system 100 will adopt different Bluetooth device pairing method to reduce the required user involvement.

Figure 3:
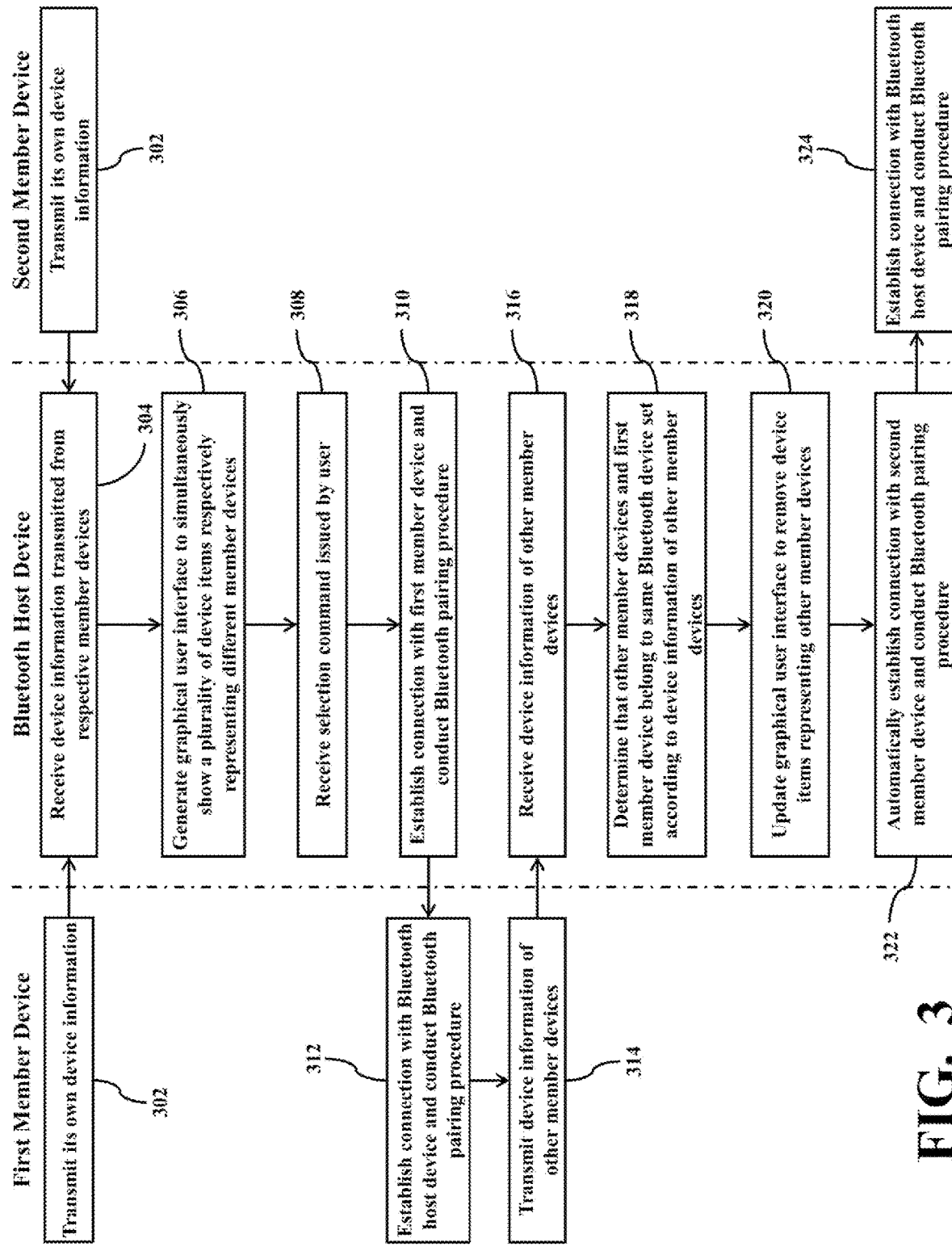
FIG. 3 shows a simplified flowchart of a Bluetooth device pairing method according to a first embodiment of the present disclosure.
Figure 4:
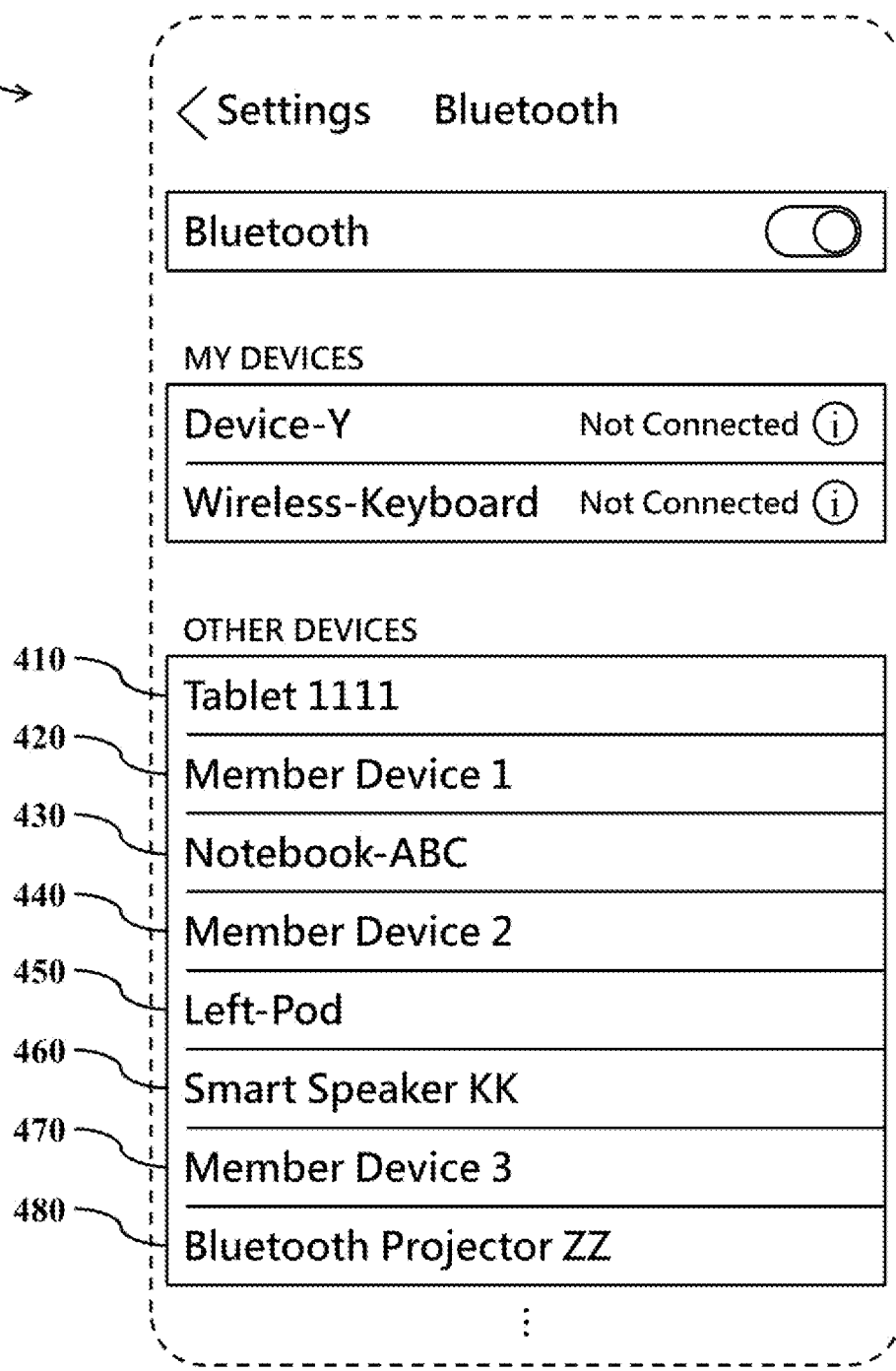
FIGS. 4-5 show simplified schematic diagrams of a graphical user interface generated by the Bluetooth host device of FIG. 1 when conducting a Bluetooth pairing operation according to a first embodiment.
Figure 5:
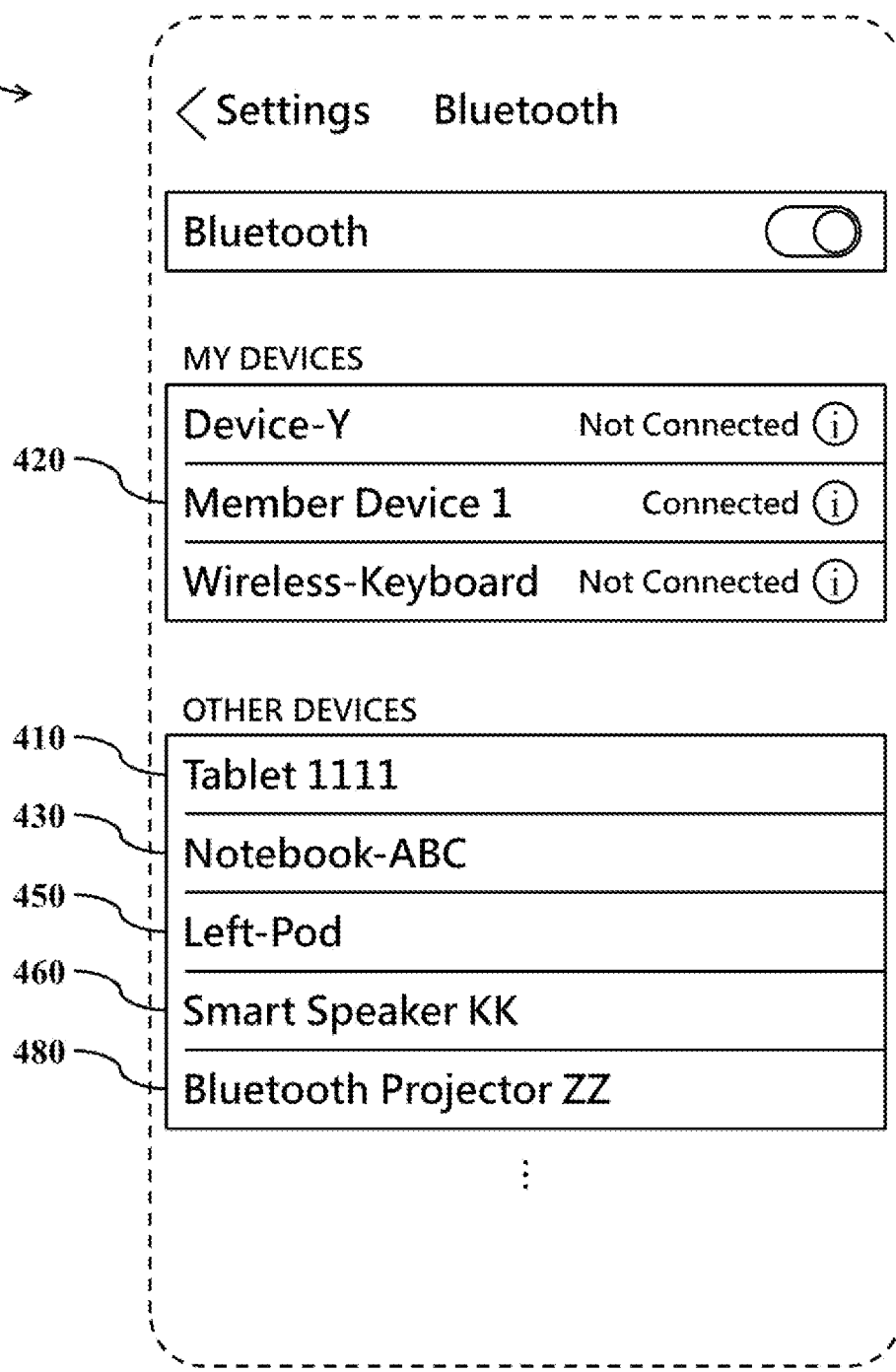

The operations of the Bluetooth communication system 100 will be further described in the following by reference to FIGS. 3-5. FIG. 3 shows a simplified flowchart of a Bluetooth device pairing method according to a first embodiment of the present disclosure. FIGS. 4-5 show simplified schematic diagrams of a graphical user interface generated by the Bluetooth host device 110 when conducting a Bluetooth pairing operation according to a first embodiment of the present disclosure.

In the flowchart of FIG. 3, operations within a column under the name of a specific device are operations to be performed by the specific device. For example, operations within a column under the label "Bluetooth host device" are operations to be performed by the Bluetooth host device 110; operations within a column under the label "first member device" are operations to be performed by the first member device 120; operations within a column under the label "second member device" are operations to be performed by the second member device 130; and so forth. The same analogous arrangement also applies to the subsequent flowcharts.

When the user wants to utilize the Bluetooth communication system 100 to playback various audio data adopting the BLE Audio technology, the Bluetooth host device 110 should be paired with respective member devices in the Bluetooth device set 102 in advance.

In this situation, the processing circuit 115 of the Bluetooth host device 110 may generate a Bluetooth inquiry request containing a device information of the Bluetooth host device 110 (e.g., a Bluetooth device address of the Bluetooth host device 110), and may utilize the host-side communication circuit 111 to transmit the Bluetooth inquiry request to other nearby Bluetooth devices, and then wait for responses from the member devices of the Bluetooth device set 102. In practice, the processing circuit 115 may also fill in other data or messages in the above Bluetooth inquiry request depending on the requirement of the function design.

Alternatively, the processing circuit 115 may control the host-side communication circuit 111 to operate in a predetermined receiving mode at an appropriate time according to the user's manipulation, or based on the default operating instructions of the internal programs. For example, the predetermined receiving mode may be an operating mode capable of receiving various Bluetooth advertising packets, such as an LE Extended Passive Scan mode, an LE Extended Active Scan mode, an LE Extended Initiator mode, or a Periodic Scanning.

On the other hand, all member devices in the Bluetooth device set 102 may enter a predetermined transmitting mode at an appropriate time according to the user's manipulation, or based on the default operating instructions of the internal programs, or may operate in the predetermined transmitting mode after receiving the Bluetooth inquiry request generated by the Bluetooth host device 110. The predetermined transmitting mode may be various operating modes capable of transmitting various Bluetooth advertising packets and/or Bluetooth protocol data units (PDUs). For example, the predetermined transmitting mode may be an Advertising mode, a Scannable mode, a Connectable mode, a Non-connectable mode, a Non-scannable mode, a Periodic Advertising mode, an LE Extended Advertising mode, or an LE Periodic Advertising mode.

All member devices in the Bluetooth device set 102 may perform the operation 302 of FIG. 3 after entering the predetermined transmitting mode.

In the operation 302, the first control circuit 125 may utilize the first communication circuit 121 to transmit its own device information (e.g., a Bluetooth device address) to the Bluetooth host device 110. For example, the first control circuit 125 may utilize the first communication circuit 121 to transmit a first device information corresponding to the first member device 120 (e.g., the Bluetooth device address of the first member device 120) to the Bluetooth host device 110.

In practice, the first control circuit 125 may generate one or more target Bluetooth packets containing the aforementioned first device information, and may utilize the first communication circuit 121 to transmit the one or more target Bluetooth packets to the Bluetooth host device 110. The first control circuit 125 may insert the aforementioned first device information into one or more specific fields of a single target Bluetooth packet, or may insert them into specific fields of multiple target Bluetooth packets in a distributed manner.

In some embodiments, the first control circuit 125 may utilize one or more predetermined Bluetooth advertising packet to be the aforementioned one or more target Bluetooth packets.

For example, the aforementioned one or more target Bluetooth packets may be one or more auxiliary advertising indication (AUX_ADV_IND) packets, or may be a group of packets formed by one or more extended advertising indication (ADV_EXT_IND) packets and one or more auxiliary advertising indication (AUX_ADV_IND) packets.

For another example, the aforementioned one or more target Bluetooth packets may be one or more auxiliary chain indication (AUX_CHAIN_IND) packets, or may be a group of packets formed by one or more extended advertising indication (ADV_EXT_IND) packets, one or more auxiliary advertising indication (AUX_ADV_IND) packets, and one or more auxiliary chain indication (AUX_CHAIN_IND) packets.

For another example, the aforementioned one or more target Bluetooth packets may be one or more auxiliary scan response (AUX_SCAN_RSP) packets, or may be a group of packets formed by one or more extended advertising indication (ADV_EXT_IND) packets, one or more auxiliary advertising indication (AUX_ADV_IND) packets, and one or more auxiliary scan response (AUX_SCAN_RSP) packets.

For another example, the aforementioned one or more target Bluetooth packets may be a group of packets formed by one or more auxiliary scan response (AUX_SCAN_RSP) packets, and one or more auxiliary chain indication (AUX_CHAIN_IND) packets.

For another example, the aforementioned one or more target Bluetooth packets may be a group of packets formed by one or more extended advertising indication (ADV_EXT_IND) packets, one or more auxiliary advertising indication (AUX_ADV_IND) packets, one or more auxiliary scan response (AUX_SCAN_RSP) packets, and one or more auxiliary chain indication (AUX_CHAIN_IND) packets.

For another example, the aforementioned one or more target Bluetooth packets may be one or more auxiliary synchronous indication (AUX_SYNC_IND) packets, or may be a group of packets formed by one or more extended advertising indication (ADV_EXT_IND) packets, one or more auxiliary advertising indication (AUX_ADV_IND) packets, and one or more auxiliary synchronous indication (AUX_SYNC_IND) packets.

For another example, the aforementioned one or more target Bluetooth packets may be one or more advertising indication (ADV_IND) packets, one or more non-connectable advertising indication (ADV_NONCONN_IND) packets, or one or more discoverable advertisement indication (ADV_DISCOVER_IND) packets.

For another example, the aforementioned one or more target Bluetooth packets may be a group of packets formed by one or more advertising indication (ADV_IND) packets, and one or more non-connectable advertising indication (ADV_NONCONN_IND) packets.

For another example, the aforementioned one or more target Bluetooth packets may be a group of packets formed by one or more advertising indication (ADV_IND) packets, and one or more discoverable advertisement indication (ADV_DISCOVER_IND) packets.

For another example, the aforementioned one or more target Bluetooth packets may be a group of packets formed by one or more advertising indication (ADV_IND) packets, one or more non-connectable advertising indication (ADV_NONCONN_IND) packets, and one or more discoverable advertisement indication (ADV_DISCOVER_IND) packets.

On the other hand, the second control circuit 135 may utilize the second communication circuit 131 to transmit its own device information (e.g., a Bluetooth device address) to the Bluetooth host device 110 in the operation 302. For example, the second control circuit 135 may utilize the second communication circuit 131 to transmit a second device information corresponding to the first member device 120 (e.g., the Bluetooth device address of the second member device 130) to the Bluetooth host device 110.

In practice, the second control circuit 135 may generate one or more target Bluetooth packets containing the aforementioned second device information, and may utilize the second communication circuit 131 to transmit the one or more target Bluetooth packets to the Bluetooth host device 110. The second control circuit 135 may insert the aforementioned second device information into one or more specific fields of a single target Bluetooth packet, or may insert them into specific fields of multiple target Bluetooth packets in a distributed manner.

The type of the target Bluetooth packets utilized by the second control circuit 135 may be the same as the type of the target Bluetooth packets utilized by the aforementioned first control circuit 125. For the sake of brevity, the descriptions will not be repeated here.

In this embodiment, other member devices (e.g., the third member device 140 in the Bluetooth device set 102) may transmit their own device information (e.g., a third device information corresponding to the third member device 140) to the Bluetooth host device 110 according to the approach adopted by the first member device 120 or the second member device 130 in the aforementioned operation 302. In other words, all member devices in the Bluetooth device set 102 may conduct the same operations in the operation 302.

In this situation, the processing circuit 115 of the Bluetooth host device 110 may execute the Bluetooth pairing program 117 in the storage circuit 113 to conduct related Bluetooth pairing operation in FIG. 3.

In the operation 304, the receiving module 210 may receive the device information transmitted from the respective member devices of the Bluetooth device set 102 through the host-side communication circuit 111. For example, the receiving module 210 may receive the first device information transmitted from the first member device 120, the second device information transmitted from the second member device 130, and the third device information transmitted from the third member device 140 through the host-side communication circuit 111. In operations, the receiving module 210 may control the processing circuit 115 to parse the one or more target Bluetooth packets transmitted from the first member device 120 to acquire the first device information corresponding to the first member device 120. The receiving module 210 may control the processing circuit 115 to parse the one or more target Bluetooth packets transmitted from the second member device 130 to acquire the second device information corresponding to the second member device 130. Similarly, the receiving module 210 may control the processing circuit 115 to parse the one or more target Bluetooth packets transmitted from the third member device 140 to acquire the third device information corresponding to the third member device 140.

In the operation 306, the GUI control module 220 may control the processing circuit 115 to generate a corresponding graphical user interface 400 as shown in FIG. 4 according to messages transmitted from multiple nearby Bluetooth devices (e.g., target Bluetooth packets transmitted from multiple nearby Bluetooth devices, or responses to the aforementioned Bluetooth inquiry request) to show multiple device items respectively representing multiple candidate devices that can conduct Bluetooth pairing with the Bluetooth host device 110. Since the receiving module 210 receives the device information transmitted from the respective member devices of the Bluetooth device set 102 in the aforementioned operation 304, the GUI control module 220 may control the processing circuit 115 to show a plurality of device items respectively representing different member devices of the Bluetooth device set 102 in the graphical user interface 400 at the same time in the operation 306. If the receiving module 210 also received messages transmitted from other Bluetooth devices in the operation 304, then the GUI control module 220 may also control the processing circuit 115 to show one or more additional device items representing other connectable Bluetooth devices that do not belong to the Bluetooth device set 102 in the graphical user interface 400 in the operation 306. As shown in FIG. 4, the graphical user interface 400 generated by the processing circuit 115 comprises multiple device items respectively representing multiple candidate devices.

The GUI control module 220 may also control the processing circuit 115 to utilize the display device 150 to display the graphical user interface 400 in the operation 306, so that the user can understand which Bluetooth devices can be selected to conduct Bluetooth pairing with the Bluetooth host device 110 from the graphical user interface 400.

For the convenience of description, exemplary device items 410, 420, 430, 440, 450, 460, 470, and 480 are shown in the embodiment of FIG. 4. In this embodiment, the device item 420, the device item 440, and the device item 470 in the graphical user interface 400 respectively represent the first member device 120, the second member device 130, and the third member device 140 of the Bluetooth device set 102. Other device items 410, 430, 450, 460, and 480 in the graphical user interface 400 respectively represent other Bluetooth devices that do not belong to the Bluetooth device set 102. In other words, the GUI control module 220 of this embodiment controls the processing circuit 115 to utilize the display device 150 to display the device item 420 representing the first member device 120, the device item 440 representing the second member device 130, and the device item 470 representing the third member device 140 in the graphical user interface 400 at the same time.

The user can know which member devices in the Bluetooth device set 102 need to perform Bluetooth pairing with the Bluetooth host device 110 based on the device items shown in the graphical user interface 400. Then, the user may manipulate the input circuit 152 to select one of the device items shown in the graphical user interface 400 to be a target with which the Bluetooth host device 110 needs to conduct Bluetooth pairing.

For example, if the user wants to select the first member device 120 of the Bluetooth device set 102 to conduct Bluetooth pairing with the Bluetooth host device 110, then the user may manipulate the input circuit 152 to select the device item 420 in the graphical user interface 400. For another example, if the user wants to select the second member device 130 of the Bluetooth device set 102 to conduct Bluetooth pairing with the Bluetooth host device 110, then the user may manipulate the input circuit 152 to select the device item 440 in the graphical user interface 400. For another example, if the user wants to select the third member device 140 of the Bluetooth device set 102 to conduct Bluetooth pairing with the Bluetooth host device 110, then the user may manipulate the input circuit 152 to select the device item 470 in the graphical user interface 400.

In this situation, the receiving module 210 may control the processing circuit 115 to utilize the input circuit 152 to perform the operation 308 to receive a selection command issued by the user. For the convenience of description, it is assumed hereinafter that the selection command issued by the user corresponds to the device item 420 for representing the first member device 120.

Then, the pairing module 230 may control the processing circuit 115 to perform the operation 310 according to the selection command to establish a connection with the first member device 120 through the host-side communication circuit 111, and to conduct Bluetooth pairing procedure to generate a first cypher key Key-1.

In this situation, the first control circuit 125 may perform the operation 312 to establish a connection with the Bluetooth host device 110 through the first communication circuit 121, and to conduct Bluetooth pairing procedure to generate a second cypher key Key-2 corresponding to the first cypher key Key-1.

In the aforementioned operation 310 and operation 312, the Bluetooth host device 110 and the first member device 120 may adopt various appropriate approaches to conduct Bluetooth pairing procedure to establish related Bluetooth connections. In addition, the Bluetooth host device 110 and the first member device 120 may adopt various appropriate approaches to negotiate the parameters of key generation to respectively generate the first cypher key Key-1 and the second cypher key Key-2.

Afterwards, the processing circuit 115 of the Bluetooth host device 110 is enabled to use the first cypher key Key-1 to conduct Bluetooth data transmission with the first member device 120 through the host-side communication circuit 111. On the other hand, the first control circuit 125 of the first member device 120 is enabled to use the second cypher key Key-2 to conduct Bluetooth data transmission with the Bluetooth host device 110 through the first communication circuit 121.

For example, in the embodiments where both the Bluetooth host device 110 and the first member device 120 support the BLE Audio technology, the Bluetooth host device 110 may adopt the BLE Audio technology to transmit audio data to the first member device 120, and the Bluetooth host device 110 can utilize the Low Complexity Communication Codec (LC3) to encode the audio data. As a result, it not only reduces the power consumption of the Bluetooth host device 110 and the first member device 120 to thereby extend the serving time of the Bluetooth host device 110 and the first member device 120, but also effectively improves the overall quality of the audio playback operations.

As shown in FIG. 3, after the first member device 120 completes the Bluetooth pairing procedure with the Bluetooth host device 110 (e.g., after the second cypher key Key-2 is generated), the first control circuit 125 may perform the operation 314 to utilize the first communication circuit 121 to transmit the device information of the other member devices to the Bluetooth host device 110 through the Bluetooth connection established in the operation 312. For example, the first control circuit 125 may utilize the first communication circuit 121 to transmit the second device information corresponding to the second member device 130 (e.g., the Bluetooth device address of the second member device 130) to the Bluetooth host device 110. In addition, the first control circuit 125 may further utilize the first communication circuit 121 to transmit the third device information corresponding to the third member device 140 (e.g., the Bluetooth device address of the third member device 140) to the Bluetooth host device 110.

In practice, the respective member devices of the Bluetooth device set 102 may adopt various appropriate approaches to acquire the device information of the other member devices in advance.

For example, the manufacturer of the Bluetooth device set 102 may pre-store the device information of the other member devices in respective member devices when producing the Bluetooth device set 102. The manufacturer may pre-record the device information of the other member devices of the Bluetooth device set 102 (e.g., the aforementioned second member device 130 and third member device 140) in an internal storage circuit (not shown in the figures) of the first member device 120 when producing the first member device 120. Similarly, the manufacturer may pre-record the device information of the other member devices of the Bluetooth device set 102 (e.g., the aforementioned first member device 120 and third member device 140) in an internal storage circuit (not shown in the figures) of the second member device 130 when producing the second member device 130.

For another example, the respective member devices of the Bluetooth device set 102 may utilize various wireless communication mechanisms to automatically search for other member devices when they are turned on, and then transmit their own device information to the other member devices.

For another example, the respective member devices of the Bluetooth device set 102 may transmit their own device information to the other member devices at an appropriate time point by utilizing various wireless signal transmission mechanisms according to the user's manipulation, or based on the default operating command of their internal program.

For another example, in the embodiments where the first member device 120 and the second member device 130 are realized with a pair of Bluetooth earphones, when the first member device 120 and the second member device 130 are put into a charging case by the user, the first control circuit 125 may utilize the first communication circuit 121 to directly transmit the first device information corresponding to the first member device 120 to the second member device 130, or may indirectly transmit the first device information to the second member device 130 by utilizing the charging case as an intermediate. Similarly, the second control circuit 135 may utilize the second communication circuit 131 to directly transmit the second device information corresponding to the second member device 130 to the first member device 120, or may indirectly transmit the first device information to the first member device 120 by utilizing the charging case as an intermediate.

As can be appreciated from the foregoing descriptions, the respective member devices of the Bluetooth device set 102 may acquire the device information of the other member devices at an appropriate time point.

In the operation 316, the receiving module 210 may receive the device information of the other member devices transmitted from the first member device 120 through the host-side communication circuit 111. For example, the receiving module 210 may receive the second device information corresponding to the second member device 130 and the third device information corresponding to the third member device 140 transmitted from the first member device 120 through the host-side communication circuit 111.

Then, the determining module 240 may control the processing circuit 115 to perform the operation 318.

In the operation 318, the determining module 240 may control the processing circuit 115 to determine that the other member devices and the first member device 120 belong to the same Bluetooth device set according to the device information of the other member devices transmitted from the first member device 120. In this embodiment, the processing circuit 115 may determine that the first member device 120, the second member device 130 corresponding to the second device information, and the third member device 140 corresponding to the third device information belong to the same Bluetooth device set (e.g., the Bluetooth device set 102 in this embodiment) according to the second device information and the third device information transmitted from the first member device 120.

After the determining module 240 determines that the first member device 120, the second member device 130, and the third member device 140 belong to the same Bluetooth device set, the GUI control module 220 performs the operation 320 and the pairing module 230 performs the operation 322.

In the operation 320, the GUI control module 220 may control the processing circuit 115 to modify the contents of the graphical user interface 400 to update the graphical user interface 400 to be a graphical user interface 500 as shown in FIG. 5, so as to remove the device items representing the other member devices of the Bluetooth device set 102.

As shown in FIG. 5, since the first member device 120 has completed the Bluetooth pairing procedure with the Bluetooth host device 110, the GUI control module 220 controls the processing circuit 115 to update the status of the device item 420 representing the first member device 120 to be "Connected" in the graphical user interface 500.

Please note that the GUI control module 220 of this embodiment also controls the processing circuit 115 to remove the device item 440 representing the second member device 130 and the device item 470 representing the third member device 140 in the graphical user interface 400. Accordingly, in comparison with the graphical user interface 400 of the aforementioned FIG. 4, the updated graphical user interface 500 does not shown the device item 440 representing the second member device 130 and the device item 470 representing the third member device 140.

Therefore, the user is unable to see the device item 440 and the device item 470 in the graphical user interface 500. As a result, the user is unable to select the device item 440 and the device item 470 from the graphical user interface 500.

Please note that the graphical user interfaces 400 and 500 shown in aforementioned FIG. 4 and FIG. 5 are merely an exemplary embodiment, rather than a restriction to practical implementations. In practice, the shape of the graphical user interfaces 400 and 500, the arrangement of objects, and the visual representation of individual objects may vary with the type of display device 150, the size of display device 150, the type of Bluetooth host device 110, and/or the operating system of the Bluetooth host device 100. In addition, the visual representation and quantity of the device items shown in the graphical user interfaces 400 and 500 is merely an exemplary embodiment, rather than a restriction to practical implementations. In practice, individual device item in the graphical user interfaces 400 and 500 may be presented in the format of various suitable texts, graphs, images, or hybrid patterns of above items, and the quantity of the device items in the graphical user interfaces 400 and 500 may vary according to actual situations.

As described previously, After the determining module 240 determines that the first member device 120, the second member device 130, and the third member device 140 belong to the same Bluetooth device set, the pairing module 230 performs the operation 322.

In the operation 322, the pairing module 230 may control the processing circuit 115 to automatically establish a connection with the second member device 130 through the host-side communication circuit 111, and to conduct Bluetooth pairing procedure to generate a third cypher key Key-3.

In this situation, the second control circuit 135 may perform the operation 324 to establish a connection with the Bluetooth host device 110 through the second communication circuit 131, and to conduct Bluetooth pairing procedure to generate a fourth cypher key Key-4 corresponding to the third cypher key Key-3.

In the aforementioned operation 322 and operation 324, the Bluetooth host device 110 and the second member device 130 may adopt various appropriate approaches to conduct Bluetooth pairing procedure to establish related Bluetooth connections. In addition, the Bluetooth host device 110 and the second member device 130 may adopt various appropriate approaches to negotiate the parameters of key generation to respectively generate the third cypher key Key-3 and the fourth cypher key Key-4.

Afterwards, the processing circuit 115 of the Bluetooth host device 110 is enabled to use the third cypher key Key-3 to conduct Bluetooth data transmission with the second member device 130 through the host-side communication circuit 111. On the other hand, the second control circuit 135 of the second member device 130 is enabled to use the fourth cypher key Key-4 to conduct Bluetooth data transmission with the Bluetooth host device 110 through the second communication circuit 131.

For example, in the embodiments where both the Bluetooth host device 110 and the second member device 130 support the BLE Audio technology, the Bluetooth host device 110 may adopt the BLE Audio technology to transmit audio data to the second member device 130, and the Bluetooth host device 110 can utilize the Low Complexity Communication Codec (LC3) to encode the audio data. As a result, it not only reduces the power consumption of the Bluetooth host device 110 and the second member device 130 to thereby extend the serving time of the Bluetooth host device 110 and the second member device 130, but also effectively improves the overall quality of the audio playback operations.

In practice, the pairing module 230 may control the processing circuit 115 to automatically establish a connection with the other member devices (e.g., the third member device 140) of the Bluetooth device set 102 through the host-side communication circuit 111, and to conduct Bluetooth pairing procedure by adopting the foregoing approach that the Bluetooth host device 110 adopted to automatically establish a connection with the second member device 130 and to conduct Bluetooth pairing operation. In other words, the Bluetooth host device 110 can automatically conduct Bluetooth pairing procedure with the other member devices in the Bluetooth device set 102.

It can be appreciated from the foregoing descriptions of FIG. 3 though FIG. 5 that after the user issues the selection command corresponding to the device item 420 in the graphical user interface 400, the Bluetooth host device 110 establishes a connection with the first member device 120 and conducts a Bluetooth pairing procedure with the first member device 120. After the Bluetooth host device 110 completes the Bluetooth pairing procedure with the first member device 120, the first member device 120 automatically transmits the device information of the other member devices to the Bluetooth host device 110 without any user manipulation or any command issued by the user. Then, without any user manipulation or any command issued by the user, the Bluetooth host device 110 would automatically establish connections with and conduct Bluetooth pairing procedure with the other member devices (e.g., the aforementioned second member device 130 and the third member device 140) in the Bluetooth device set 102 according to the device information of the other member devices provided by the first member device 120.

In other words, when the user wants to utilize the Bluetooth host device 110 to conduct Bluetooth pairing operation with all member devices in the Bluetooth device set 102, the user only needs to select a single device item corresponding to a selected member device (e.g., the device item 420 representing the first member device 120 in the foregoing embodiment) from the graphical user interface 400, the Bluetooth host device 110 will conduct Bluetooth pairing operation with the selected member device (e.g., the first member device 120 in the foregoing embodiment), and then the Bluetooth host device 110 will automatically conduct Bluetooth pairing operation with the other member devices (e.g., the aforementioned second member device 130 and the third member device 140) in the Bluetooth device set 102.

Apparently, the Bluetooth device pairing method of FIG. 3 can significantly simplify the user's manipulation when pairing the Bluetooth host device 110 with all member devices of the Bluetooth device set 102, and thus can effectively reduce the complexity of manipulating the Bluetooth pairing operation for the user.

In addition, as described previously, after the Bluetooth host device 110 completes the Bluetooth pairing procedure with the first member device 120, the GUI control module 220 further controls the processing circuit 115 to update the graphical user interface 400 to be the graphical user interface 500 in the operation 320, so as to remove the device item 440 representing the second member device 130 and the device item 470 representing the third member device 140. As a result, it can effectively prevent the user from erroneously selecting the device item 440 or the device item 470 from the graphical user interface 500. Therefore, adopting the Bluetooth pairing method of FIG. 3 can not only improve the convenience of the user when pairing the Bluetooth host device 110 with the Bluetooth device set 120, but also effectively avoid the problem caused by user manipulation errors during the above Bluetooth pairing procedure.

From another aspect, the Bluetooth device pairing method in FIG. 3 only requires the user to select a single device item from the graphical user interface 400, and does not require the user to perform multiple device selection actions. Therefore, it can not only minimize the required user involvement, but also greatly shorten the time required for the Bluetooth host device 110 to complete the Bluetooth pairing with all member devices in the Bluetooth device set 102.

Additionally, in the embodiments where the Bluetooth host device 110 and the member devices in the Bluetooth device set 102 support the BLE Audio technology, the Bluetooth host device 110 may adopt the BLE Audio technology to transmit audio data to the member devices of the Bluetooth device set 102, and the Bluetooth host device 110 can utilize the Low Complexity Communication Codec (LC3) to encode the audio data. As a result, it not only reduces the power consumption of the Bluetooth host device 110 and the member devices of the Bluetooth device set 102 to thereby extend the serving time of the Bluetooth host device 110 and the member devices of the Bluetooth device set 102, but also effectively improves the overall quality of the audio playback operations.

Figure 6:
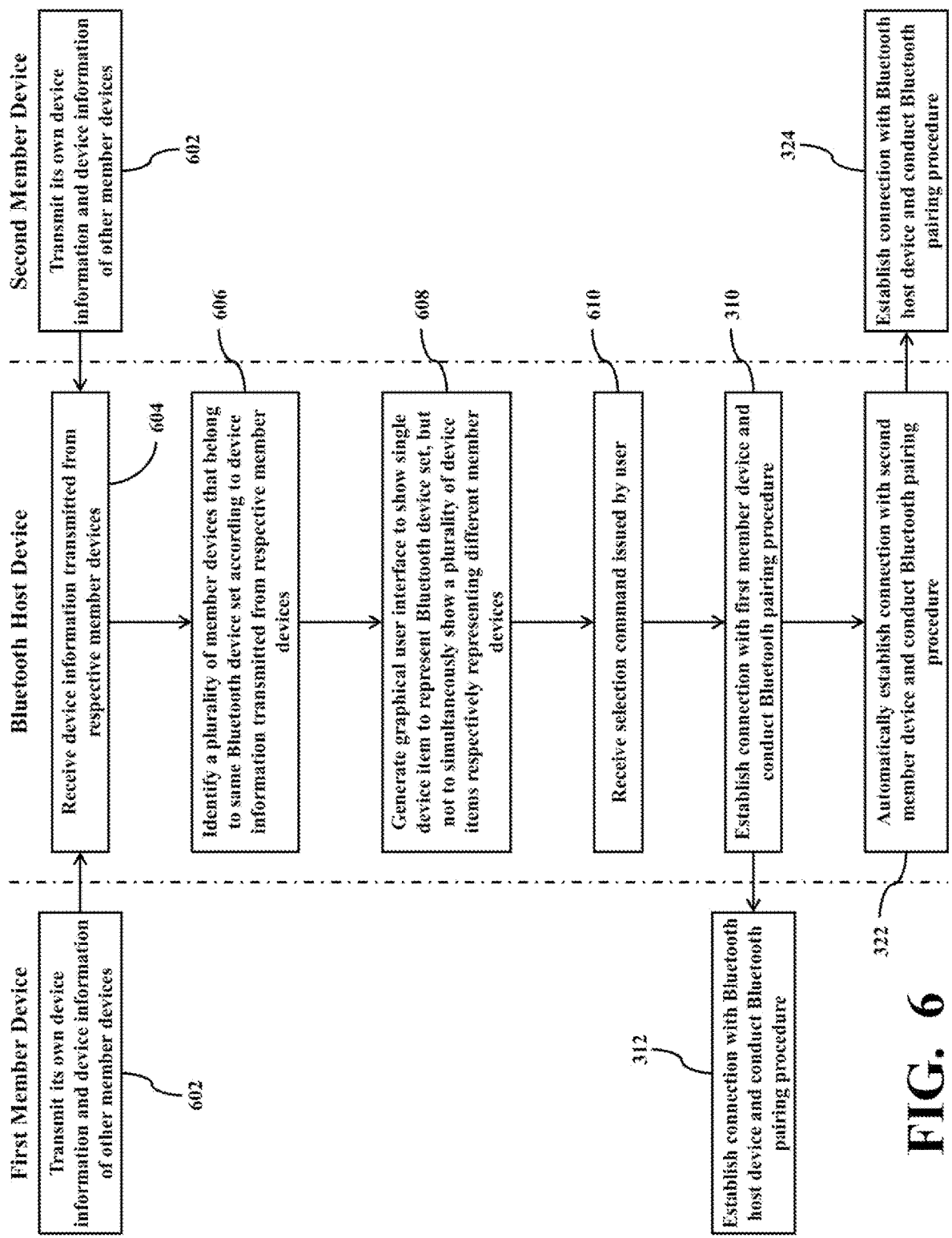
FIG. 6 shows a simplified flowchart of a Bluetooth device pairing method according to a second embodiment of the present disclosure.
Figure 7:
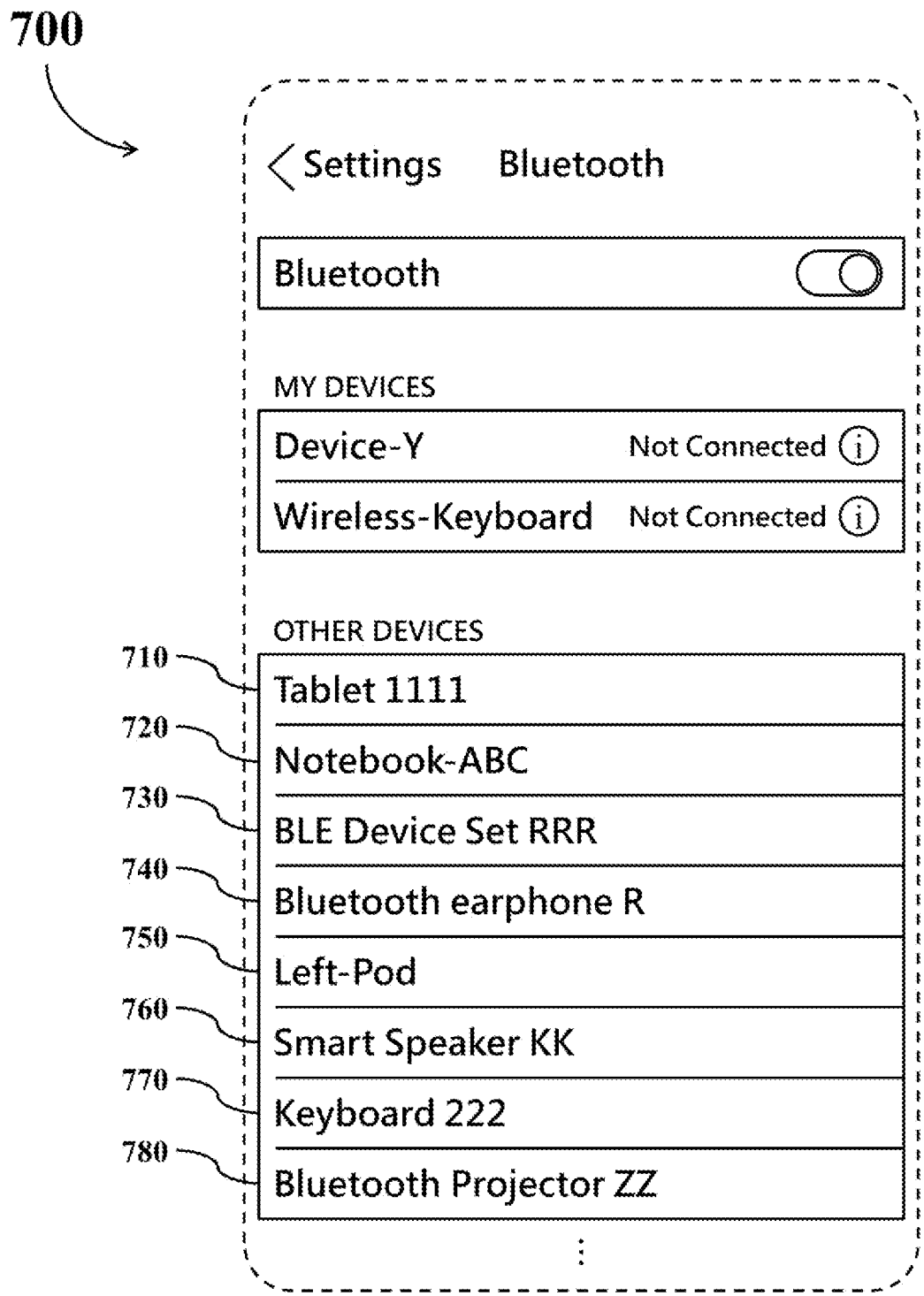
FIGS. 7-8 show simplified schematic diagrams of a graphical user interface generated by the Bluetooth host device of FIG. 1 when conducting a Bluetooth pairing operation according to a second embodiment.
Figure 8:
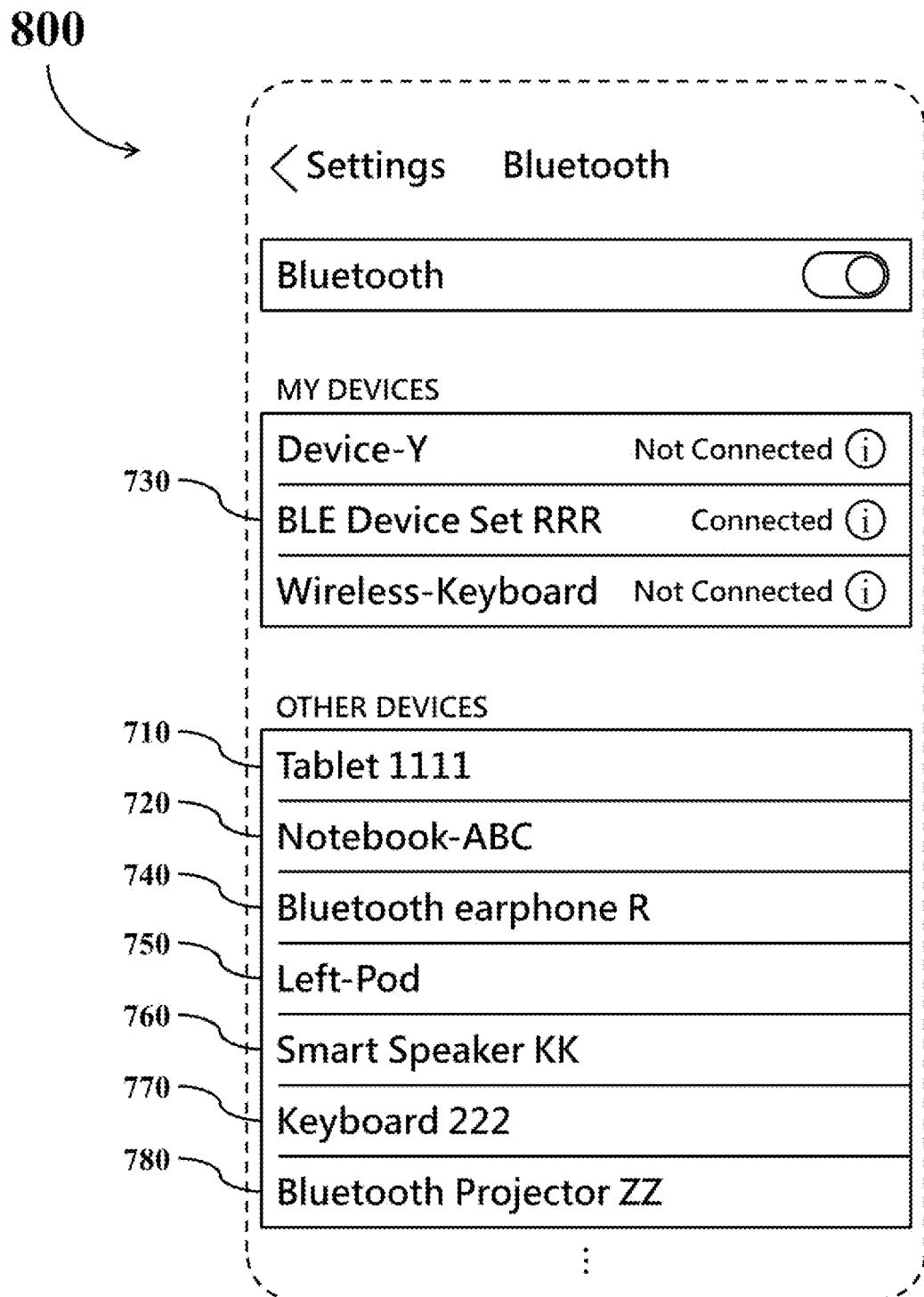

Another operation of the Bluetooth communication system 100 will be further described in the following by reference to FIG. 6 through FIG. 8. FIG. 6 shows a simplified flowchart of a Bluetooth device pairing method according to a second embodiment of the present disclosure. FIG. 7 through FIG. 8 show simplified schematic diagrams of a graphical user interface generated by the Bluetooth host device 110 when conducting a Bluetooth pairing operation according to a second embodiment of the present disclosure.

As described previously, when the Bluetooth host device 110 needs to conduct Bluetooth pairing operation with the Bluetooth device set 102, the processing circuit 115 of the Bluetooth host device 110 may generate a Bluetooth inquiry request containing the device information of the Bluetooth host device 110 (e.g., the Bluetooth device address of the Bluetooth host device 110), and may utilize the host-side communication circuit 111 to transmit the Bluetooth inquiry request to other nearby Bluetooth devices, and then wait for responses from the member devices of the Bluetooth device set 102.

Alternatively, the processing circuit 115 may control the host-side communication circuit 111 to operate in the aforementioned predetermined receiving mode at an appropriate time according to the user's manipulation, or based on the default operating instructions of the internal program.

On the other hand, all member devices in the Bluetooth device set 102 may enter a predetermined transmitting mode at an appropriate time according to the user's manipulation, or based on the default operating instructions of the internal programs, or may operate in the predetermined transmitting mode after receiving the Bluetooth inquiry request generated by the Bluetooth host device 110.

After entering the predetermined transmitting mode, all member devices of the Bluetooth device set 102 may perform the operation 602 of FIG. 6.

In the operation 602, the first control circuit 125 may utilize the first communication circuit 121 to transmit its own device information and the device information of other member devices (e.g., Bluetooth device address) to the Bluetooth host device 110. For example, the first control circuit 125 may utilize the first communication circuit 121 to transmit a first device information corresponding to the first member device 120 (e.g., the Bluetooth device address of the first member device 120), a the second device information corresponding to the second member device 130 (e.g., the Bluetooth device address of the second member device 130), and a third device information corresponding to the third member device 140 (e.g., the Bluetooth device address of the third member device 140) to the Bluetooth host device 110.

In practice, the first control circuit 125 may generate the one or more target Bluetooth packets containing the aforementioned first device information, the second device information, and the third device information, and utilize the first communication circuit 121 to transmit the one or more target Bluetooth packets to the Bluetooth host device 110. The first control circuit 125 may insert the aforementioned first device information, second device information, and third device information into one or more specific fields of a single target Bluetooth packet, or may insert them into specific fields of multiple target Bluetooth packets in a distributed manner.

On the other hand, the second control circuit 135 may utilize the second communication circuit 131 to transmit its device information and the device information (e.g., Bluetooth device address) of other member devices to the Bluetooth host device 110 in the operation 602. For example, the second control circuit 135 may utilize the second communication circuit 131 to transmit the aforementioned first device information, second device information, and third device information to the Bluetooth host device 110.

In practice, the second control circuit 135 may generate one or more target Bluetooth packets containing the aforementioned first device information, second device information, and third device information, and utilize the second communication circuit 131 to transmit the one or more target Bluetooth packets to the Bluetooth host device 110. Similarly, the second control circuit 135 may insert the aforementioned first device information, second device information, and third device information into one or more specific fields of a single target Bluetooth packet, or may insert them into specific fields of multiple target Bluetooth packets in a distributed manner.

The type of the target Bluetooth packets employed in the method of FIG. 6 may be the same as the type of the target Bluetooth packets employed in the aforementioned method of FIG. 3. For the sake of brevity, the descriptions will not be repeated here.

In this embodiment, other member devices in the Bluetooth device set 102 (e.g., the third member device 140) may transmit its device information and device information of the other member devices to the Bluetooth host device 110 by adopting the approach that the first member device 120 or the second member device 130 adopted in the aforementioned operation 602. In other words, all member devices of the Bluetooth device set 102 may perform the same operation in the operation 602.

Similar with the aforementioned embodiment of FIG. 3, the respective member devices of the Bluetooth device set 102 may utilize various suitable approaches to acquire the device information of the other member devices in advance at appropriate time point.

The processing circuit 115 of the Bluetooth host device 110 may execute the Bluetooth pairing program 117 in the storage circuit 113 to conduct related Bluetooth pairing operation in FIG. 6.

In the operation 604, the receiving module 210 may receive the device information transmitted from the respective member devices of the Bluetooth device set 102 through the host-side communication circuit 111. For example, the receiving module 210 may receive the first device information, the second device information, and the third device information transmitted from the first member device 120 through the host-side communication circuit 111. For another example, the receiving module 210 may receive the first device information, the second device information, and the third device information transmitted from the second member device 130 through the host-side communication circuit 111. Similarly, the receiving module 210 may receive the first device information, the second device information, and the third device information transmitted from the third member device 140 through the host-side communication circuit 111. In operations, the receiving module 210 may control the processing circuit 115 to parse the one or more target Bluetooth packets transmitted from the first member device 120 to acquire the aforementioned first device information, second device information, and third device information. The receiving module 210 may control the processing circuit 115 to parse the one or more target Bluetooth packets transmitted from the second member device 130 to acquire the aforementioned first device information, second device information, and third device information. Similarly, the receiving module 210 may control the processing circuit 115 to parse the one or more target Bluetooth packets transmitted from the third member device 140 to acquire the aforementioned first device information, second device information, and third device information.

Then, the determining module 240 may control the processing circuit 115 to perform the operation 606 of FIG. 6.

In the operation 606, the determining module 240 may control the processing circuit 115 to identify a plurality of member devices that belong to the same Bluetooth device set according to multiple device information transmitted from the respective member devices. For example, the processing circuit 115 may identify that the first member device 120 corresponding to the first device information, the second member device 130 corresponding to the second device information, and the third member device 140 corresponding to the third device information belong to the same Bluetooth device set (e.g., the Bluetooth device set 102 in this embodiment) according to the first device information, the second device information, and the third device information transmitted from the first member device 120, the second member device 130, or the third member device 140.

After the determining module 240 identifies that the first member device 120, the second member device 130, and the third member device 140 belong to the same Bluetooth device set, the GUI control module 220 performs the operation 608.

In the operation 608, the GUI control module 220 may control the processing circuit 115 to generate a corresponding graphical user interface 700 as shown in FIG. 7 according to messages transmitted from multiple nearby Bluetooth devices (e.g., target Bluetooth packets transmitted from multiple nearby Bluetooth devices, or responses to the aforementioned Bluetooth inquiry request) to show multiple device items respectively representing multiple candidate devices that can conduct Bluetooth pairing with the Bluetooth host device 110.

In this embodiment, the GUI control module 220 controls the processing circuit 115 to filter the device items to be displayed in the graphical user interface 700 according to the identification result of the determining module 240, so that the contents of the graphical user interface 700 contain a single device item for representing the entire Bluetooth device set 102, but do not contain a plurality of device items for respectively representing a plurality of member devices of the Bluetooth device set 102.

If the receiving module 210 also received messages transmitted from other Bluetooth devices in the operation 604, then the GUI control module 220 may also control the processing circuit 115 to show one or more additional device items representing other connectable Bluetooth devices that do not belong to the Bluetooth device set 102 in the graphical user interface 700 in the operation 608. As shown in FIG. 7, the graphical user interface 700 generated by the processing circuit 115 comprises multiple device items respectively representing multiple candidate devices.

The GUI control module 220 may also control the processing circuit 115 to utilize the display device 150 to display the graphical user interface 700 in the operation 608, so that the user can understand which Bluetooth devices can be selected to conduct Bluetooth pairing with the Bluetooth host device 110 from the graphical user interface 700.

For the convenience of description, exemplary device items 710, 720, 730, 740, 750, 760, 770, and 780 are shown in the embodiment of FIG. 7. In this embodiment, the device item 730 in the graphical user interface 700 represents the Bluetooth device set 102 to which the first member device 120, the second member device 130, and the third member device 140 belong. The other device items 710, 720, 740, 750, 760, 770, and 780 in the graphical user interface 700 respectively represent other Bluetooth device that do not belong to the Bluetooth device set 102. In other words, the GUI control module 220 of this embodiment controls the processing circuit 115 to utilize the display device 150 to display a single device item 730 for representing the Bluetooth device set 102 in the graphical user interface 700, but not to display a plurality of devices items for respectively representing the first member device 120, the second member device 130, and the third member device 140 in the graphical user interface 700, in order to further simplify the complexity of manipulating the Bluetooth pairing operation for the user.

The user can understand which Bluetooth devices can be selected to conduct Bluetooth pairing with the Bluetooth host device 110 from the graphical user interface 700 displayed by display device 150. If the GUI control module 220 does not control the processing circuit 115 to conduct filtering on the device items to be displayed in the graphical user interface 700 in the operation 608, then multiple device items respectively representing multiple member devices of the Bluetooth device set 102 may be shown in the graphical user interface 700. As a result, more devices items will be shown in the graphical user interface 700, which may make it difficult for the user to find the correct pairing target.

From another aspect, the operation of filtering device items to be shown in the graphical user interface 700 conducted by the GUI control module 220 in the aforementioned operation 608 can simplify the complexity of user's manipulation during the Bluetooth pairing procedure, and can reduce the possibility of user's erroneous manipulation.

The user may manipulate the input circuit 152 to select the device item 730 representing the Bluetooth device set 102 to be a target with which the Bluetooth host device 110 needs to conduct Bluetooth pairing.

In this situation, the receiving module 210 may control the processing circuit 115 to utilize the input circuit 152 to perform the operation 610 to receive a selection command corresponding to the device item 730 issued by the user.

Then, the pairing module 230 may control the processing circuit 115 to perform the operation 310 and the operation 322 of FIG. 6 according to the selection command.

In the operation 310, the pairing module 230 may control the processing circuit 115 to automatically establish a connection with the first member device 120 through the host-side communication circuit 111, and to conduct Bluetooth pairing procedure to generate a first cypher key Key-1.

In this situation, the first control circuit 125 may perform the operation 312 to establish a connection with the Bluetooth host device 110 through the first communication circuit 121, and to conduct Bluetooth pairing procedure to generate a second cypher key Key-2 corresponding to the first cypher key Key-1.

In the operation 310 and the operation 312 of FIG. 6, the Bluetooth host device 110 and the first member device 120 may adopt various appropriate approaches to conduct Bluetooth pairing procedure to establish related Bluetooth connections. In addition, the Bluetooth host device 110 and the first member device 120 may adopt various appropriate approaches to negotiate the parameters of key generation to respectively generate the first cypher key Key-1 and the second cypher key Key-2.

Then, the processing circuit 115 of the Bluetooth host device 110 is enabled to use the first cypher key Key-1 to conduct Bluetooth data transmission with the first member device 120 through the host-side communication circuit 111. On the other hand, the first control circuit 125 of the first member device 120 is enabled to use the second cypher key Key-2 to conduct Bluetooth data transmission with the Bluetooth host device 110 through the first communication circuit 121.

For example, in the embodiments where both the Bluetooth host device 110 and the first member device 120 support the BLE Audio technology, the Bluetooth host device 110 may adopt the BLE Audio technology to transmit audio data to the first member device 120, and the Bluetooth host device 110 can utilize the Low Complexity Communication Codec (LC3) to encode the audio data. As a result, it not only reduces the power consumption of the Bluetooth host device 110 and the first member device 120 to thereby extend the serving time of the Bluetooth host device 110 and the first member device 120, but also effectively improves the overall quality of the audio playback operations.

In the operation 322 of FIG. 6, the pairing module 230 may control the processing circuit 115 to automatically establish a connection with the second member device 130 through the host-side communication circuit 111, and to conduct Bluetooth pairing procedure to generate a third cypher key Key-3.

In this situation, the second control circuit 135 may perform the operation 324 of FIG. 6 to establish a connection with the Bluetooth host device 110 through the second communication circuit 131, and to conduct Bluetooth pairing procedure to generate a fourth cypher key Key-4 corresponding to the third cypher key Key-3.

In the operation 322 and the operation 324 of FIG. 6, the Bluetooth host device 110 and the second member device 130 may adopt various appropriate approaches to conduct Bluetooth pairing procedure to establish related Bluetooth connections. In addition, the Bluetooth host device 110 and the second member device 130 may adopt various appropriate approaches to negotiate the parameters of key generation to respectively generate the third cypher key Key-3 and the fourth cypher key Key-4.

Then, the processing circuit 115 of the Bluetooth host device 110 is enabled to use the third cypher key Key-3 to conduct Bluetooth data transmission with the second member device 130 through the host-side communication circuit 111. On the other hand, the second control circuit 135 of the second member device 130 is enabled to use the fourth cypher key Key-4 to conduct Bluetooth data transmission with the Bluetooth host device 110 through the second communication circuit 131.

For example, in the embodiments where both the Bluetooth host device 110 and the second member device 130 support the BLE Audio technology, the Bluetooth host device 110 may adopt the BLE Audio technology to transmit audio data to the second member device 130, and the Bluetooth host device 110 can utilize the Low Complexity Communication Codec (LC3) to encode the audio data. As a result, it not only reduces the power consumption of the Bluetooth host device 110 and the second member device 130 to thereby extend the serving time of the Bluetooth host device 110 and the second member device 130, but also effectively improves the overall quality of the audio playback operations.

In practice, the pairing module 230 may control the processing circuit 115 to automatically establish connections with the other member devices (e.g., the third member device 140) of the Bluetooth device set 102 through the host-side communication circuit 111, and to conduct Bluetooth pairing procedure by adopting the aforementioned approaches of controlling the Bluetooth host device 110 to automatically establish a connection with the second member device 130 and to conduct Bluetooth pairing operation. In other words, the Bluetooth host device 110 can automatically conduct Bluetooth pairing procedure with the other member devices in the Bluetooth device set 102.

Before the Bluetooth host device 110 completes the Bluetooth pairing procedure with all member devices of the Bluetooth device set 102, the GUI control module 220 does not change the status of the device item 730 in the graphical user interface 700.

When the Bluetooth host device 110 completes the Bluetooth pairing procedure with all member devices of the Bluetooth device set 102, the GUI control module 220 may control the processing circuit 115 to modify the contents of the graphical user interface 700 to update the graphical user interface 700 to be a graphical user interface 800 as shown in FIG. 8, so as to update the status of the device item 730.

As shown in FIG. 8, since the Bluetooth host device 110 has completed the Bluetooth pairing procedure with all member devices of the Bluetooth device set 102 in this stage, the GUI control module 220 controls the processing circuit 115 to update the status of the device item 730 representing the Bluetooth device set 102 to be "Connected" in the graphical user interface 800.

It can be found from the contents of the graphical user interfaces 700 and 800 that before the processing circuit 115 utilizes the host-side communication circuit 111 to conduct Bluetooth pairing procedure with the first member device 120, the GUI control module 220 does not utilize the display device 150 to display any device item for representing the first member device 120 in the graphical user interface 700. Before the processing circuit 115 utilizes the host-side communication circuit 111 to conduct Bluetooth pairing procedure with the second member device 130, the GUI control module 220 does not utilize the display device 150 to display any device item for representing the second member device 130 in the graphical user interface 700. Similarly, before the processing circuit 115 utilizes the host-side communication circuit 111 to conduct Bluetooth pairing procedure with the third member device 140, the GUI control module 220 does not utilize the display device 150 to display any device item for representing the third member device 140 in the graphical user interface 700.

In other words, before the Bluetooth host device 110 completes the Bluetooth pairing procedure with all member devices of the Bluetooth device set 102, the graphical user interface 700 does not simultaneously display three device items for respectively representing the first member device 120, the second member device 130, and the second member device 130.

In the foregoing embodiment of FIG. 6, all member devices of the Bluetooth device set 102 will transmit their own device information and the device information of the other member devices to the Bluetooth host device 110 in the operation 602. But this merely an exemplary embodiment, rather than a restriction to practical implementations. In practice, it may be modified to be an alternative case where only some member devices will transmit their own device information and the device information of the other member devices to the Bluetooth host device 110.

Figure 9:
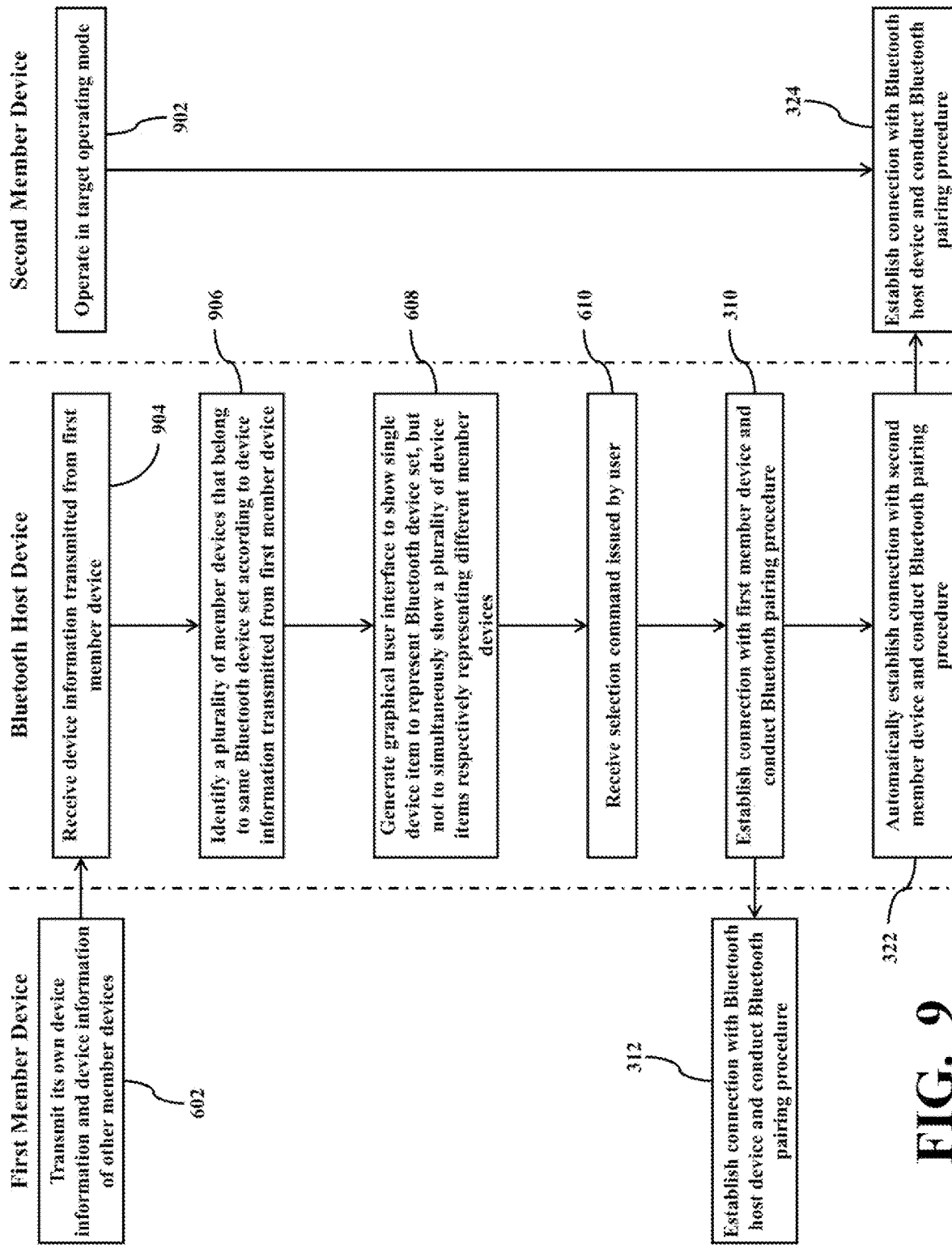
FIG. 9 shows a simplified flowchart of a Bluetooth device pairing method according to a third embodiment of the present disclosure.

For example, FIG. 9 shows a simplified flowchart of a Bluetooth device pairing method according to a third embodiment of the present disclosure. Similar to the foregoing embodiment of FIG. 6, when the Bluetooth host device 110 needs to conduct Bluetooth pairing operation with the Bluetooth device set 102, the processing circuit 115 of the Bluetooth host device 110 may generate a Bluetooth inquiry request containing the device information of the Bluetooth host device 110 (e.g., the Bluetooth device address of the Bluetooth host device 110), and may utilize the host-side communication circuit 111 to transmit the Bluetooth inquiry request to other nearby Bluetooth devices, and then wait for responses from the member devices of the Bluetooth device set 102.

Alternatively, the processing circuit 115 may control the host-side communication circuit 111 to operate in the aforementioned predetermined receiving mode at an appropriate time according to the user's manipulation, or based on the default operating instructions of the internal program.

On the other hand, the first member device 120 of the Bluetooth device set 102 may enter a predetermined transmitting mode at an appropriate time according to the user's manipulation, or based on the default operating instructions of the internal programs, or may operate in the predetermined transmitting mode after receiving the Bluetooth inquiry request generated by the Bluetooth host device 110.

After entering the predetermined transmitting mode, the first member device 120 may perform the operation 602 of FIG. 9. As described previously, the first control circuit 125 may utilize the first communication circuit 121 to transmit its device information and the device information of other member devices (e.g., Bluetooth device address) to the Bluetooth host device 110 in the operation 602. For example, the first control circuit 125 may utilize the first communication circuit 121 to transmit a first device information corresponding to the first member device 120 (e.g., the Bluetooth device address of the first member device 120), a the second device information corresponding to the second member device 130 (e.g., the Bluetooth device address of the second member device 130), and a third device information corresponding to the third member device 140 (e.g., the Bluetooth device address of the third member device 140) to the Bluetooth host device 110.

Similar with the aforementioned embodiment of FIG. 3, the first member device 120 may utilize various suitable approaches to acquire the device information of the other member devices in advance at appropriate time point.

In practice, the first control circuit 125 may generate one or more target Bluetooth packets containing the aforementioned first device information, second device information, and third device information, and utilize the first communication circuit 121 to transmit the one or more target Bluetooth packets to the Bluetooth host device 110. The first control circuit 125 may insert the aforementioned first device information, second device information, and third device information into one or more specific fields of a single target Bluetooth packet, or may insert them into specific fields of multiple target Bluetooth packets in a distributed manner.

The type of the target Bluetooth packets utilized by the first member device 120 in the embodiment of FIG. 9 may be the same as the type of the target Bluetooth packets employed in the aforementioned embodiment of FIG. 3. For the sake of brevity, the descriptions will not be repeated here However, different from the foregoing embodiment of FIG. 6, other member devices in the Bluetooth device set 102 (e.g., the second member device 130 and the third member device 140) in the embodiment of FIG. 9 perform the operation 902 instead of the aforementioned operation 602 before they conduct Bluetooth pairing operation with the Bluetooth host device 110.

In the operation 902, other member devices in the Bluetooth device set 102 operate in a target operating mode. Other member devices in the Bluetooth device set 102 may begin the operation 902 at an appropriate time according to the user's manipulation or based on the default operating command of the internal program, or may begin the operation 902 after receiving the Bluetooth inquiry request generated by the Bluetooth host device 110.

In one embodiment, the target operating mode is the aforementioned predetermined transmitting mode, but in this embodiment, other member devices in the Bluetooth device set 102 do not transmit the device information of the other member devices to the Bluetooth host device 110 after entering the target operating mode.

In another embodiment, the target operating mode is a page scan mode. After entering the page scan mode, other member devices in the Bluetooth device set 102 will wait for the Bluetooth host device 110 to page them, but before that, other member devices in the Bluetooth device set 102 do not transmit any Bluetooth packet to the Bluetooth host device 110.

In the embodiment of FIG. 9, the processing circuit 115 of the Bluetooth host device 110 may execute the Bluetooth pairing program 117 in the storage circuit 113 to perform related Bluetooth pairing operation of FIG. 9.

In the operation 904, the receiving module 210 may receive the first device information, the second device information, and the third device information transmitted from the first member device 120 through the host-side communication circuit 111. In operations, the receiving module 210 may control the processing circuit 115 to parse the one or more target Bluetooth packets transmitted from the first member device 120 to acquire the aforementioned first device information, second device information, and third device information.

Then, the determining module 240 may control the processing circuit 115 to perform the operation 906 of FIG. 9.

In the operation 906, the determining module 240 may control the processing circuit 115 to identify that the first member device 120 corresponding to the first device information, the second member device 130 corresponding to the second device information, and the third member device 140 corresponding to the third device information belong to the same Bluetooth device set (e.g., the Bluetooth device set 102 in this embodiment) according to the first device information, the second device information, and the third device information transmitted from the first member device 120.

After the determining module 240 identifies that the first member device 120, the second member device 130, and the third member device 140 belong to the same Bluetooth device set, the GUI control module 220 perform the operation 608 of FIG. 9.

The operation 608, the operation 610, the operation 310, the operation 312, the operation 322, and the operation 324 of FIG. 9 are the same as corresponding operations in the foregoing embodiment of FIG. 3 and FIG. 6. Therefore, the foregoing descriptions regarding the operations and related advantages of the corresponding operations in FIG. 3 and FIG. 6 are also applicable to the embodiment of FIG. 9. For the sake of brevity, the descriptions will not be repeated here.

It can be appreciated from the foregoing descriptions of FIG. 6 though FIG. 9 that after the user issues the selection command corresponding to the device item 730 in the graphical user interface 700, the Bluetooth host device 110 will automatically establish connections with respective member devices of the Bluetooth device set 102 and conduct Bluetooth pairing procedure with the respective member devices.

In other words, when the user wants to utilize the Bluetooth host device 110 to conduct Bluetooth pairing operation with all member devices in the Bluetooth device set 102, the user only needs to select the single device item 730 corresponding to the Bluetooth device set 102 from the graphical user interface 700, the Bluetooth host device 110 will automatically conduct Bluetooth pairing operation with all member devices of the Bluetooth device set 102.

Apparently, the Bluetooth device pairing method of FIG. 6 or FIG. 9 can significantly simplify the user's manipulation when pairing the Bluetooth host device 110 with all member devices of the Bluetooth device set 102, and thus can effectively reduce the complexity of manipulating the Bluetooth pairing operation for the user.

In addition, as described previously, the GUI control module 220 controls the processing circuit 115 to conduct filtering on the device items to be displayed in the graphical user interface 700 in the operation 608. Accordingly, before the Bluetooth host device 110 completes the Bluetooth pairing procedure with all member devices of the Bluetooth device set 102, the graphical user interface 700 does not simultaneously display three device items for respectively representing the first member device 120, the second member device 130, and the second member device 130. As a result, the quantity of the device items displayed in the graphical user interface 700 can be reduced, thereby making it easier for the user to find the correct device item 730.

Therefore, adopting the Bluetooth pairing method of FIG. 6 or FIG. 9 can not only improve the convenience of the user when pairing the Bluetooth host device 110 with the Bluetooth device set 120, but also effectively avoid the problem caused by user manipulation errors during the above Bluetooth pairing procedure.

From another aspect, the Bluetooth device pairing method in FIG. 6 or FIG. 9 only requires the user to select a single device item 730 from the graphical user interface 700, and does not require the user to perform multiple device selection actions. Therefore, it can not only minimize the required user involvement, but also greatly shorten the time required for the Bluetooth host device 110 to complete the Bluetooth pairing with all member devices in the Bluetooth device set 102.

Additionally, in the embodiments where the Bluetooth host device 110 and the member devices in the Bluetooth device set 102 support the BLE Audio technology, the Bluetooth host device 110 may adopt the BLE Audio technology to transmit audio data to the member devices of the Bluetooth device set 102, and the Bluetooth host device 110 can utilize the Low Complexity Communication Codec (LC3) to encode the audio data. As a result, it not only reduces the power consumption of the Bluetooth host device 110 and the member devices of the Bluetooth device set 102 to thereby extend the serving time of the Bluetooth host device 110 and the member devices of the Bluetooth device set 102, but also effectively improves the overall quality of the audio playback operations.

Figure 10:
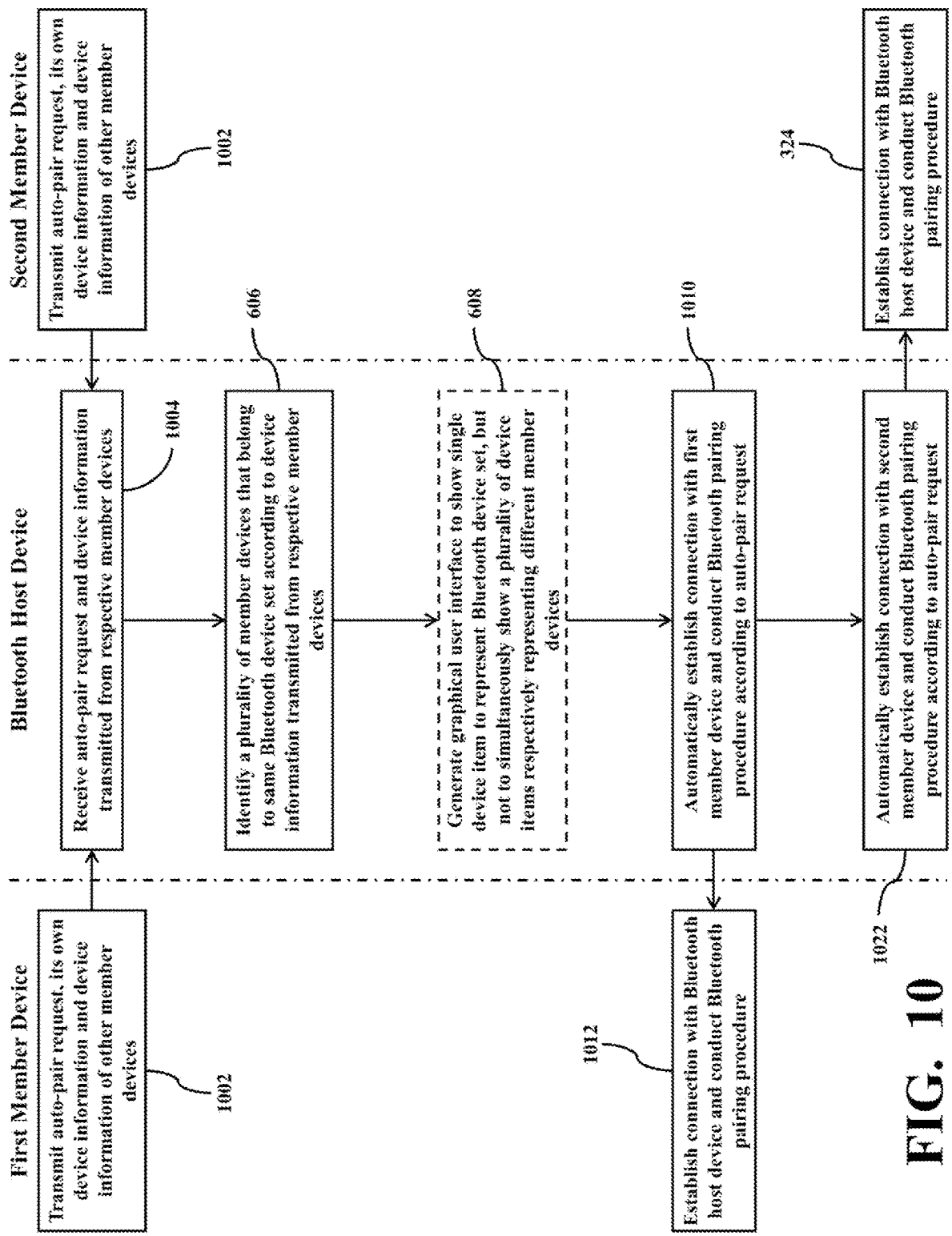
FIG. 10 shows a simplified flowchart of a Bluetooth device pairing method according to a fourth embodiment of the present disclosure.

Another operation of the Bluetooth communication system 100 will be further described in the following by reference to FIG. 10 and the aforementioned FIG. 7 and FIG. 8. FIG. 10 shows a simplified flowchart of a Bluetooth device pairing method according to a fourth embodiment of the present disclosure.

As described previously, when the Bluetooth host device 110 needs to conduct Bluetooth pairing operation with the Bluetooth device set 102, the processing circuit 115 of the Bluetooth host device 110 may generate a Bluetooth inquiry request containing the device information of the Bluetooth host device 110 (e.g., the Bluetooth device address of the Bluetooth host device 110), and may utilize the host-side communication circuit 111 to transmit the Bluetooth inquiry request to other nearby Bluetooth devices, and then wait for responses from the member devices of the Bluetooth device set 102.

Alternatively, the processing circuit 115 may control the host-side communication circuit 111 to operate in the aforementioned predetermined receiving mode at an appropriate time according to the user's manipulation, or based on the default operating instructions of the internal program.

On the other hand, all member devices in the Bluetooth device set 102 may enter a predetermined transmitting mode at an appropriate time according to the user's manipulation, or based on the default operating instructions of the internal programs, or may operate in the predetermined transmitting mode after receiving the Bluetooth inquiry request generated by the Bluetooth host device 110.

After entering the predetermined transmitting mode, all member devices of the Bluetooth device set 102 may perform the operation 1002 of FIG. 10.

In the operation 1002, the first control circuit 125 may utilize the first communication circuit 121 to transmit an auto-pair request, its own device information (e.g., the Bluetooth device address), and the device information of other member devices to the Bluetooth host device 110. For example, the first control circuit 125 may utilize the first communication circuit 121 to transmit an auto-pair request, a first device information corresponding to the first member device 120 (e.g., the Bluetooth device address of the first member device 120), a second device information corresponding to the second member device 130 (e.g., the Bluetooth device address of the second member device 130), and a third device information corresponding to the third member device 140 (e.g., the Bluetooth device address of the third member device 140) to the Bluetooth host device 110.

In practice, the first control circuit 125 may generate one or more target Bluetooth packets containing the aforementioned auto-pair request, the first device information, the second device information, and the third device information, and utilize the first communication circuit 121 to transmit the one or more target Bluetooth packets to the Bluetooth host device 110. The first control circuit 125 may insert the aforementioned auto-pair request, the first device information, the second device information, and the third device information into one or more specific fields of a single target Bluetooth packet, or may insert them into specific fields of multiple target Bluetooth packets in a distributed manner.

On the other hand, the second control circuit 135 may utilize the second communication circuit 131 to transmit an auto-pair request, its own device information (e.g., the Bluetooth device address), and the device information of other member devices to the Bluetooth host device 110 in the operation 602. For example, the second control circuit 135 may utilize the second communication circuit 131 to transmit the aforementioned auto-pair request, the first device information, the second device information, and the third device information to the Bluetooth host device 110.

In practice, the second control circuit 135 may generate one or more target Bluetooth packets containing the aforementioned auto-pair request, the first device information, the second device information, and the third device information, and utilize the second communication circuit 131 to transmit the one or more target Bluetooth packets to the Bluetooth host device 110. Similarly, the second control circuit 135 may insert the aforementioned auto-pair request, the first device information, the second device information, and the third device information into one or more specific fields of a single target Bluetooth packet, or may insert them into specific fields of multiple target Bluetooth packets in a distributed manner.

The type of the target Bluetooth packets employed in the method of FIG. 10 may be the same as the type of the target Bluetooth packets employed in the aforementioned method of FIG. 3. For the sake of brevity, the descriptions will not be repeated here.

In this embodiment, other member devices in the Bluetooth device set 102 (e.g., the third member device 140) may transmit the auto-pair request, its own device information, and the device information of the other member devices to the Bluetooth host device 110 according to the approached adopted by the first member device 120 or the second member device 130 in the foregoing operation 1002. In other words, all member devices of the Bluetooth device set 102 may conduct the same operations in the operation 1002.

Similar with the aforementioned embodiment of FIG. 3, the respective member devices of the Bluetooth device set 102 may utilize various suitable approaches to acquire the device information of the other member devices in advance at appropriate time point.

The processing circuit 115 of the Bluetooth host device 110 may execute the Bluetooth pairing program 117 in the storage circuit 113 to conduct related Bluetooth pairing operation in FIG. 10.

In the operation 1004, the receiving module 210 may receive the auto-pair request and the device information transmitted from the respective member devices of the Bluetooth device set 102 through the host-side communication circuit 111. For example, the receiving module 210 may receive the auto-pair request, the first device information, the second device information, and the third device information transmitted from the first member device 120 through the host-side communication circuit 111. For another example, the receiving module 210 may receive the auto-pair request, the first device information, the second device information, and the third device information transmitted from the second member device 130 through the host-side communication circuit 111. Similarly, the receiving module 210 may receive the auto-pair request, the first device information, the second device information, and the third device information transmitted from the third member device 140 through the host-side communication circuit 111. In operations, the receiving module 210 may control the processing circuit 115 to parse the one or more target Bluetooth packets transmitted from the first member device 120 to acquire the aforementioned auto-pair request, the first device information, the second device information, and the third device information. The receiving module 210 may control the processing circuit 115 to parse the one or more target Bluetooth packets transmitted from the second member device 130 to acquire the aforementioned auto-pair request, the first device information, the second device information, and the third device information. Similarly, the receiving module 210 may control the processing circuit 115 to parse the one or more target Bluetooth packets transmitted from the third member device 140 to acquire the aforementioned auto-pair request, the first device information, the second device information, and the third device information.

Then, the determining module 240 may control the processing circuit 115 to perform the operation 606 of FIG. 10.

In the operation 606, the determining module 240 may control the processing circuit 115 to identify a plurality of member devices that belong to the same Bluetooth device set according to multiple device information transmitted from the respective member devices. For example, the processing circuit 115 may identify that the first member device 120 corresponding to the first device information, the second member device 130 corresponding to the second device information, and the third member device 140 corresponding to the third device information belong to the same Bluetooth device set (e.g., the Bluetooth device set 102 in this embodiment) according to the first device information, the second device information, and the third device information transmitted from the first member device 120, the second member device 130, or the third member device 140.

After the determining module 240 identifies that the first member device 120, the second member device 130, and the third member device 140 belong to the same Bluetooth device set, the GUI control module 220 performs the operation 608 of FIG. 10.

In the operation 608, the GUI control module 220 may control the processing circuit 115 to generate the graphical user interface 700 as shown in FIG. 7 according to messages transmitted from multiple nearby Bluetooth devices (e.g., target Bluetooth packets transmitted from multiple nearby Bluetooth devices, or responses to the aforementioned Bluetooth inquiry request) to show multiple device items respectively representing multiple candidate devices that can conduct Bluetooth pairing with the Bluetooth host device 110.

Similar with the embodiment of FIG. 6, the GUI control module 220 may control the processing circuit 115 to filter the device items to be displayed in the graphical user interface 700 according to the identification result of the determining module 240, so that the contents of the graphical user interface 700 contain a single device item for representing the entire Bluetooth device set 102, but do not contain a plurality of device items for respectively representing a plurality of member devices of the Bluetooth device set 102.

If the receiving module 210 also received messages transmitted from other Bluetooth devices in the operation 1004, then the GUI control module 220 may also control the processing circuit 115 to show one or more additional device items representing other connectable Bluetooth devices that do not belong to the Bluetooth device set 102 in the graphical user interface 700 in the operation 608. As shown in FIG. 7, the graphical user interface 700 generated by the processing circuit 115 comprises multiple device items respectively representing multiple candidate devices.

The GUI control module 220 may also control the processing circuit 115 to utilize the display device 150 to display the graphical user interface 700 in the operation 608, so that the user can understand which Bluetooth devices can be selected to conduct Bluetooth pairing with the Bluetooth host device 110 from the graphical user interface 700.

As described previously, the device item 730 in the graphical user interface 700 represents the Bluetooth device set 102 to which the first member device 120, the second member device 130, and the third member device 140 belong. The other device items 710, 720, 740, 750, 760, 770, and 780 in the graphical user interface 700 respectively represent other Bluetooth device that do not belong to the Bluetooth device set 102. In other words, the GUI control module 220 of this embodiment controls the processing circuit 115 to utilize the display device 150 to display a single device item 730 for representing the Bluetooth device set 102 in the graphical user interface 700, but not to display a plurality of devices items for respectively representing the first member device 120, the second member device 130, and the third member device 140 in the graphical user interface 700, in order to further simplify the complexity of manipulating the Bluetooth pairing operation for the user.

The user can understand which Bluetooth devices can be selected to conduct Bluetooth pairing with the Bluetooth host device 110 from the graphical user interface 700 displayed by display device 150. If the GUI control module 220 does not control the processing circuit 115 to conduct filtering on the device items to be displayed in the graphical user interface 700 in the operation 608, then multiple device items respectively representing multiple member devices of the Bluetooth device set 102 may be shown in the graphical user interface 700. As a result, more devices items will be shown in the graphical user interface 700, which may make it difficult for the user to find the correct pairing target.

From another aspect, the operation of filtering device items to be shown in the graphical user interface 700 conducted by the GUI control module 220 in the aforementioned operation 608 can simplify the complexity of user's manipulation during the Bluetooth pairing procedure, and can reduce the possibility of user's erroneous manipulation.

In the embodiment of FIG. 10, the user is not required to select the device item 730 representing the Bluetooth device set 102 through the input circuit 152. The pairing module 230 will automatically control the processing circuit 115 to perform the operation 1010 and the operation 1022 of FIG. 10 according to the auto-pair request received by the receiving module 210.

In the operation 1010, the pairing module 230 may control the processing circuit 115 to automatically establish a connection with the first member device 120 through the host-side communication circuit 111, and to conduct Bluetooth pairing procedure to generate a first cypher key Key-1 according to the received auto-pair request.

In this situation, the first control circuit 125 may perform the operation 1012 to establish a connection with the Bluetooth host device 110 through the first communication circuit 121, and to conduct Bluetooth pairing procedure to generate a second cypher key Key-2 corresponding to the first cypher key Key-1.

In the operation 1010 and the operation 1012 of FIG. 10, the Bluetooth host device 110 and the first member device 120 may adopt various appropriate approaches to conduct Bluetooth pairing procedure to establish related Bluetooth connections. In addition, the Bluetooth host device 110 and the first member device 120 may adopt various appropriate approaches to negotiate the parameters of key generation to respectively generate the first cypher key Key-1 and the second cypher key Key-2.

Afterwards, the processing circuit 115 of the Bluetooth host device 110 is enabled to use the first cypher key Key-1 to conduct Bluetooth data transmission with the first member device 120 through the host-side communication circuit 111. On the other hand, the first control circuit 125 of the first member device 120 is enabled to use the second cypher key Key-2 to conduct Bluetooth data transmission with the Bluetooth host device 110 through the first communication circuit 121.

For example, in the embodiments where both the Bluetooth host device 110 and the first member device 120 support the BLE Audio technology, the Bluetooth host device 110 may adopt the BLE Audio technology to transmit audio data to the first member device 120, and the Bluetooth host device 110 can utilize the Low Complexity Communication Codec (LC3) to encode the audio data. As a result, it not only reduces the power consumption of the Bluetooth host device 110 and the first member device 120 to thereby extend the serving time of the Bluetooth host device 110 and the first member device 120, but also effectively improves the overall quality of the audio playback operations.

In the operation 1022, the pairing module 230 may control the processing circuit 115 to automatically establish a connection with the second member device 130 through the host-side communication circuit 111, and to conduct Bluetooth pairing procedure to generate a third cypher key Key-3.

In this situation, the second control circuit 135 may perform the operation 324 of FIG. 10 to establish a connection with the Bluetooth host device 110 through the second communication circuit 131, and to conduct Bluetooth pairing procedure to generate a fourth cypher key Key-4 corresponding to the third cypher key Key-3.

In the operation 1022 and the operation 324 of FIG. 10, the Bluetooth host device 110 and the second member device 130 may adopt various appropriate approaches to conduct Bluetooth pairing procedure to establish related Bluetooth connections. In addition, the Bluetooth host device 110 and the second member device 130 may adopt various appropriate approaches to negotiate the parameters of key generation to respectively generate the third cypher key Key-3 and the fourth cypher key Key-4.

Afterwards, the processing circuit 115 of the Bluetooth host device 110 is enabled to use the third cypher key Key-3 to conduct Bluetooth data transmission with the second member device 130 through the host-side communication circuit 111. On the other hand, the second control circuit 135 of the second member device 130 is enabled to use the fourth cypher key Key-4 to conduct Bluetooth data transmission with the Bluetooth host device 110 through the second communication circuit 131.

For example, in the embodiments where both the Bluetooth host device 110 and the second member device 130 support the BLE Audio technology, the Bluetooth host device 110 may adopt the BLE Audio technology to transmit audio data to the second member device 130, and the Bluetooth host device 110 can utilize the Low Complexity Communication Codec (LC3) to encode the audio data. As a result, it not only reduces the power consumption of the Bluetooth host device 110 and the second member device 130 to thereby extend the serving time of the Bluetooth host device 110 and the second member device 130, but also effectively improves the overall quality of the audio playback operations.

In practice, the pairing module 230 may control the processing circuit 115 to automatically establish connections with the other member devices (e.g., the third member device 140) of the Bluetooth device set 102 through the host-side communication circuit 111, and to conduct Bluetooth pairing procedure by adopting the aforementioned approaches of controlling the Bluetooth host device 110 to automatically establish a connection with the second member device 130 and to conduct Bluetooth pairing operation. In other words, the Bluetooth host device 110 can automatically conduct Bluetooth pairing procedure with the other member devices in the Bluetooth device set 102 according to the received auto-pair request.

Before the Bluetooth host device 110 completes the Bluetooth pairing procedure with all member devices of the Bluetooth device set 102, the GUI control module 220 does not change the status of the device item 730 in the graphical user interface 700.

When the Bluetooth host device 110 completes the Bluetooth pairing procedure with all member devices of the Bluetooth device set 102, the GUI control module 220 may control the processing circuit 115 to modify the contents of the graphical user interface 700 to update the graphical user interface 700 to be the graphical user interface 800 as shown in FIG. 8, so as to update the status of the device item 730.

As shown in FIG. 8, since the Bluetooth host device 110 has completed the Bluetooth pairing procedure with all member devices of the Bluetooth device set 102 in this stage, the GUI control module 220 controls the processing circuit 115 to update the status of the device item 730 representing the Bluetooth device set 102 to be "Connected" in the graphical user interface 800.

It can be found from the contents of the graphical user interfaces 700 and 800 that before the processing circuit 115 utilizes the host-side communication circuit 111 to conduct Bluetooth pairing procedure with the first member device 120, the GUI control module 220 does not utilize the display device 150 to display any device item for representing the first member device 120 in the graphical user interface 700. Before the processing circuit 115 utilizes the host-side communication circuit 111 to conduct Bluetooth pairing procedure with the second member device 130, the GUI control module 220 does not utilize the display device 150 to display any device item for representing the second member device 130 in the graphical user interface 700. Similarly, before the processing circuit 115 utilizes the host-side communication circuit 111 to conduct Bluetooth pairing procedure with the third member device 140, the GUI control module 220 does not utilize the display device 150 to display any device item for representing the third member device 140 in the graphical user interface 700.

In other words, before the Bluetooth host device 110 completes the Bluetooth pairing procedure with all member devices of the Bluetooth device set 102, the graphical user interface 700 does not simultaneously display three device items for respectively representing the first member device 120, the second member device 130, and the second member device 130.

In the foregoing embodiment of FIG. 10, all member devices of the Bluetooth device set 102 will transmit an auto-pair request, their own device information, and the device information of the other member devices to the Bluetooth host device 110 in the operation 1002. But this merely an exemplary embodiment, rather than a restriction to practical implementations. In practice, it may be modified to be an alternative case where only some member devices will transmit the auto-pair request, their own device information, and the device information of the other member devices to the Bluetooth host device 110.

Figure 11:
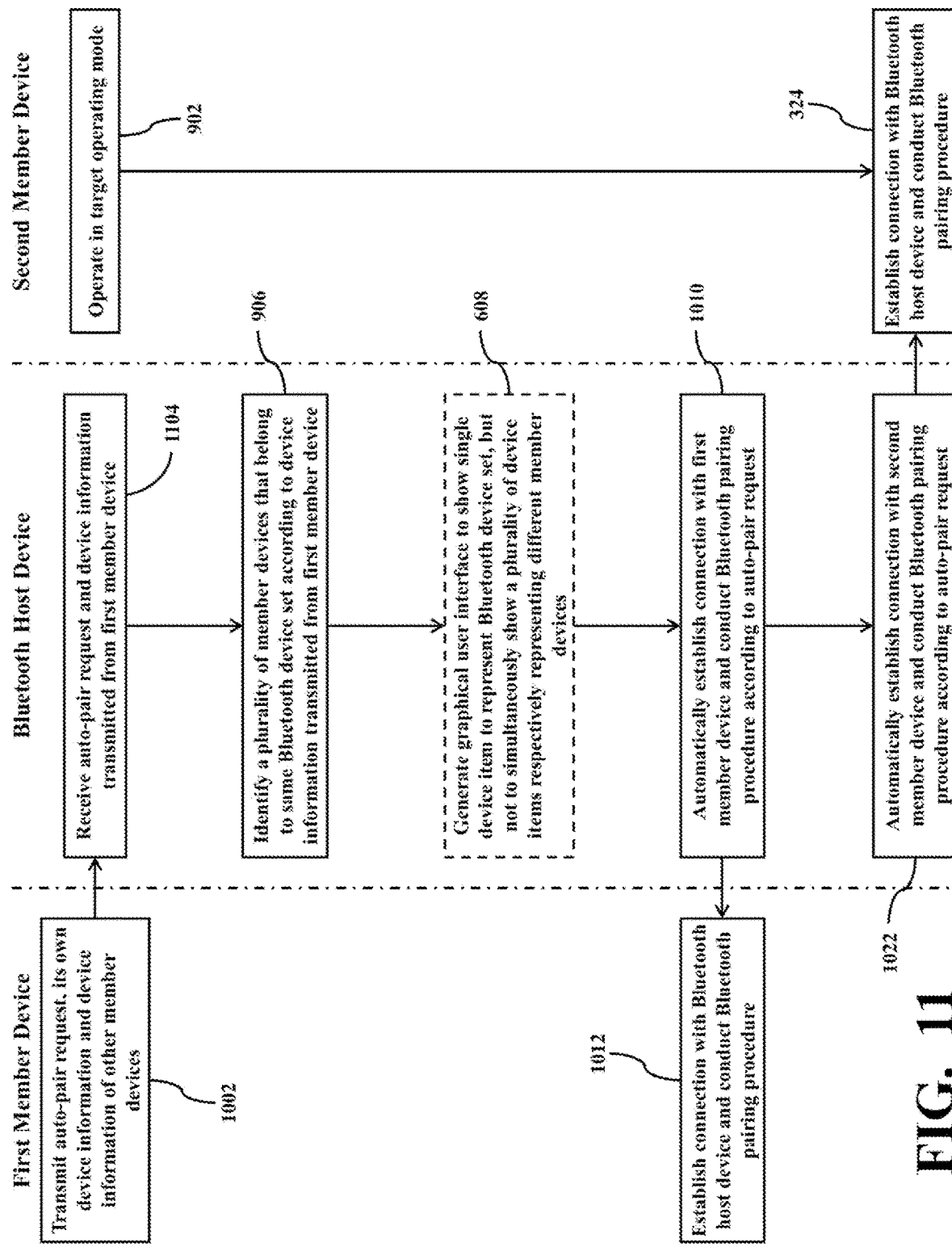
FIG. 11 shows a simplified flowchart of a Bluetooth device pairing method according to a fifth embodiment of the present disclosure

For example, FIG. 11 shows a simplified flowchart of a Bluetooth device pairing method according to a fifth embodiment of the present disclosure. Similar to the foregoing embodiment of FIG. 10, when the Bluetooth host device 110 needs to conduct Bluetooth pairing operation with the Bluetooth device set 102, the processing circuit 115 of the Bluetooth host device 110 may generate a Bluetooth inquiry request containing the device information of the Bluetooth host device 110 (e.g., the Bluetooth device address of the Bluetooth host device 110), and may utilize the host-side communication circuit 111 to transmit the Bluetooth inquiry request to other nearby Bluetooth devices, and then wait for responses from the member devices of the Bluetooth device set 102.

Alternatively, the processing circuit 115 may control the host-side communication circuit 111 to operate in the aforementioned predetermined receiving mode at an appropriate time according to the user's manipulation, or based on the default operating instructions of the internal program.

On the other hand, the first member device 120 of the Bluetooth device set 102 may enter a predetermined transmitting mode at an appropriate time according to the user's manipulation, or based on the default operating instructions of the internal programs, or may operate in the predetermined transmitting mode after receiving the Bluetooth inquiry request generated by the Bluetooth host device 110.

After entering the predetermined transmitting mode, the first member device 120 may perform the operation 1002 of FIG. 11. As described previously, the first control circuit 125 may utilize the first communication circuit 121 to transmit the auto-pair request, its device information (e.g., Bluetooth device address), and the device information of other member devices to the Bluetooth host device 110 in the operation 1002. For example, the first control circuit 125 may utilize the first communication circuit 121 to transmit the auto-pair request, a first device information corresponding to the first member device 120 (e.g., the Bluetooth device address of the first member device 120), a the second device information corresponding to the second member device 130 (e.g., the Bluetooth device address of the second member device 130), and a third device information corresponding to the third member device 140 (e.g., the Bluetooth device address of the third member device 140) to the Bluetooth host device 110.

Similar with the aforementioned embodiment of FIG. 3, the first member device 120 may utilize various suitable approaches to acquire the device information of the other member devices in advance at appropriate time point.

In practice, the first control circuit 125 may generate one or more target Bluetooth packets containing the aforementioned auto-pair request, the first device information, the second device information, and the third device information, and utilize the first communication circuit 121 to transmit the one or more target Bluetooth packets to the Bluetooth host device 110. The first control circuit 125 may insert the aforementioned auto-pair request, the first device information, the second device information, and the third device information into one or more specific fields of a single target Bluetooth packet, or may insert them into specific fields of multiple target Bluetooth packets in a distributed manner.

The type of the target Bluetooth packets utilized by the first member device 120 in the embodiment of FIG. 11 may be the same as the type of the target Bluetooth packets employed in the aforementioned embodiment of FIG. 3. For the sake of brevity, the descriptions will not be repeated here However, different from the foregoing embodiment of FIG. 10, other member devices in the Bluetooth device set 102 (e.g., the second member device 130 and the third member device 140) in the embodiment of FIG. 11 perform the operation 902 instead of the aforementioned operation 1002 before they conduct Bluetooth pairing operation with the Bluetooth host device 110.

In the operation 902, other member devices in the Bluetooth device set 102 operate in a target operating mode. As described previously, other member devices in the Bluetooth device set 102 may begin the operation 902 at an appropriate time according to the user's manipulation or based on the default operating command of the internal program, or may begin the operation 902 after receiving the Bluetooth inquiry request generated by the Bluetooth host device 110.

In one embodiment, the target operating mode is the aforementioned predetermined transmitting mode, but in this embodiment, other member devices in the Bluetooth device set 102 do not transmit the auto-pair request and the device information of the other member devices to the Bluetooth host device 110 after entering the target operating mode.

In another embodiment, the target operating mode is a page scan mode. After entering the page scan mode, other member devices in the Bluetooth device set 102 will wait for the Bluetooth host device 110 to page them, but before that, other member devices in the Bluetooth device set 102 do not transmit the auto-pair request and any Bluetooth packet to the Bluetooth host device 110.

In the embodiment of FIG. 11, the processing circuit 115 of the Bluetooth host device 110 may execute the Bluetooth pairing program 117 in the storage circuit 113 to perform related Bluetooth pairing operation of FIG. 11.

In the operation 1104, the receiving module 210 may receive the auto-pair request, the first device information, the second device information, and the third device information transmitted from the first member device 120 through the host-side communication circuit 111. In operations, the receiving module 210 may control the processing circuit 115 to parse the one or more target Bluetooth packets transmitted from the first member device 120 to acquire the aforementioned auto-pair request, first device information, second device information, and third device information.

Other operations in FIG. 11 are the same as the corresponding operations in the foregoing embodiments of FIG. 3, FIG. 6, FIG. 9, and FIG. 10. Therefore, the foregoing descriptions regarding the operations and related advantages of corresponding operation in FIG. 3, FIG. 6, FIG. 9, and FIG. 10 are also applicable to the embodiment of FIG. 11. For the sake of brevity, the descriptions will not be repeated here.

It can be appreciated from the foregoing descriptions of FIG. 10 and FIG. 11 that after the Bluetooth host device 110 receives the auto-pair request and related device information transmitted from the first member device 120 or other member devices, the Bluetooth host device 110 will automatically conduct Bluetooth pairing operation with all member devices of the Bluetooth device set 102 according to the auto-pair request.

In other words, in the embodiment of FIG. 10 or FIG. 11, when the user wants to utilize the Bluetooth host device 110 to conduct Bluetooth pairing operation with all member devices in the Bluetooth device set 102, the user does not need to issue any selection command, the Bluetooth host device 110 is enabled to automatically conduct Bluetooth pairing operation with all member devices of the Bluetooth device set 102 according to the auto-pair request transmitted from the Bluetooth device set 102. Therefore, it can not only minimize the required user involvement, but also greatly shorten the time required for the Bluetooth host device 110 to complete the Bluetooth pairing with all member devices in the Bluetooth device set 102.

Apparently, the Bluetooth device pairing method of FIG. 10 or FIG. 11 can significantly simplify the user's manipulation when pairing the Bluetooth host device 110 with all member devices of the Bluetooth device set 102, and thus can effectively reduce the complexity of manipulating the Bluetooth pairing operation for the user.

In addition, as described previously, the GUI control module 220 controls the processing circuit 115 to conduct filtering on the device items to be displayed in the graphical user interface 700 in the operation 608. Accordingly, before the Bluetooth host device 110 completes the Bluetooth pairing procedure with all member devices of the Bluetooth device set 102, the graphical user interface 700 does not simultaneously display three device items for respectively representing the first member device 120, the second member device 130, and the second member device 130. As a result, the quantity of the device items displayed in the graphical user interface 700 can be reduced, thereby reducing the complexity of the contents of the graphical user interface 700.

Therefore, adopting the Bluetooth pairing method of FIG. 10 or FIG. 11 can not only improve the convenience of the user when pairing the Bluetooth host device 110 with the Bluetooth device set 120, but also effectively avoid the problem caused by user manipulation errors during the above Bluetooth pairing procedure.

From another aspect, the Bluetooth host device 110 and the respective member devices of the Bluetooth device set 102 do not need to utilize any display device when adopting the Bluetooth device pairing method of FIG. 10 or FIG. 11. Accordingly, in some embodiments, display device 150 may be omitted, and the hardware structure, the weight, and the volume of the respective member devices of the Bluetooth device set 102 can be significantly simplified. In this situation, the operation 608 in FIG. 10 and FIG. 11 may be omitted.

Additionally, in the embodiments where the Bluetooth host device 110 and the member devices in the Bluetooth device set 102 support the BLE Audio technology, the Bluetooth host device 110 may adopt the BLE Audio technology to transmit audio data to the member devices of the Bluetooth device set 102, and the Bluetooth host device 110 can utilize the Low Complexity Communication Codec (LC3) to encode the audio data. As a result, it not only reduces the power consumption of the Bluetooth host device 110 and the member devices of the Bluetooth device set 102 to thereby extend the serving time of the Bluetooth host device 110 and the member devices of the Bluetooth device set 102, but also effectively improves the overall quality of the audio playback operations.

Please note that the cypher key generating method described in previous embodiments is merely an exemplary embodiment, rather than a restriction to the practical implementations of the present disclosure.

In practice, in each of the previous embodiments, the first control circuit 125 may respectively transmit the cypher key generation parameters required for conducting the Bluetooth pairing between the Bluetooth host device 110 and other member devices to the Bluetooth host device 110 and other member devices after the Bluetooth pairing procedure between the first member device 120 and the Bluetooth host device 110 is completed (i.e., after the aforementioned operation 312 or operation 1012).

For example, the first control circuit 125 may generate an indication value required for conducting the Bluetooth pairing operation between the Bluetooth host device 110 and other member devices (e.g., the second member device 130 and the third member device 140) after the aforementioned operation 312 or operation 1012. In one embodiment, the aforementioned indication value is a predetermined value, a random value, a predetermined address, a random address, a predetermined string, a random string, a predetermined token, a random token, or the like for use in a predetermined cypher key algorithm. In another embodiment, the aforementioned indication value is an algorithm identifier corresponding to a predetermined cypher key algorithm.

The first control circuit 125 may utilize the first communication circuit 121 to transmit the aforementioned indication value to the Bluetooth host device 110 and other member devices.

Afterwards, when the pairing module 230 controls the processing circuit 115 to conduct Bluetooth pairing operation with the second member device 130 through the host-side communication circuit 111 (e.g., in the aforementioned operation 322 or operation 1022), the pairing module 230 may control the processing circuit 115 to generate the aforementioned third cypher key Key-3 according to the foregoing indication value transmitted from the first member device 120. For example, the processing circuit 115 may execute a predetermined cypher key algorithm to generate the third cypher key Key-3 according to the indication value and the second device information corresponding to the second member device 130. For another example, the processing circuit 115 may execute the aforementioned predetermined cypher key algorithm to generate the third cypher key Key-3 according to the indication value, the second device information, and the device information of the Bluetooth host device 110. For another example, the processing circuit 115 may select a predetermined cypher key algorithm from a plurality of pre-agreed key algorithms according to the indication value, and execute the selected predetermined cypher key algorithm to generate the third cypher key Key-3.

In this situation, the second control circuit 135 may establish a connection with the Bluetooth host device 110 through the second communication circuit 131, and may generate the fourth cypher key Key-4 corresponding to the third cypher key Key-3 according to the indication value. For example, the second control circuit 135 may execute the aforementioned predetermined cypher key algorithm to generate the fourth cypher key Key-4 according to the indication value and the second device information corresponding to the second member device 130. For another example, the second control circuit 135 may execute the aforementioned predetermined cypher key algorithm to generate the fourth cypher key Key-4 according to the indication value, the second device information, and the device information of the Bluetooth host device 110. For another example, the second control circuit 135 may select a predetermined cypher key algorithm from a plurality of pre-agreed key algorithms according to the indication value, and execute the selected predetermined cypher key algorithm to generate the fourth cypher key Key-4.

In other words, after the aforementioned indication value is provided by the first member device 120, the Bluetooth host device 110 and the second member device 130 are enabled to omit many traditional key parameter negotiation steps, and instead adopt a highly simplified approach to generate the corresponding third cypher key Key-3 and fourth cypher key Key-4. As a result, it can significantly reduce the required time for generating the third cypher key Key-3, and the fourth cypher key Key-4.

Similarly, when the Bluetooth host device 110 and the third member device 140 need to conduct Bluetooth pairing operation, the Bluetooth host device 110 and the third member device 140 may respectively generate related cypher keys according to the aforementioned indication value by adopting the foregoing method to reduce the required time for generating related cypher keys.

In addition, the aforementioned executing order of the operations in each flowchart is merely an exemplary embodiment, rather than a restriction to the practical implementations of the present disclosure.

For example, in FIG. 3, the operation 322 may be performed at the same time with the operation 320, or may be performed between the operation 318 and the operation 320.

For another example, in FIG. 6 and FIG. 9, the operation 310 and the operation 322 may be performed in a reverse order, or may be performed at the same time.

For another example, in FIG. 9, the operation 902 may be performed at the same time with the operation 602, or may be performed prior to the operation 602, or may be performed at any time point between the operation 602 and the operation 322.

For another example, in FIG. 10 and FIG. 11, the operation 902 may be performed at the same time with the operation 1002, or may be performed prior to the operation 1002, or may be performed at any time point between the operation 1002 and the operation 1022.

For another example, in FIG. 10 and FIG. 11, the operation 1010 and the operation 1022 may be performed in a reverse order, or may be performed at the same time.

In some embodiments where the Bluetooth device set 102 does not need to capture the user's voice or ambient sounds, the first sound capturing circuit 164, the second sound capturing circuit 174, and/or the third sound capturing circuit 184 may be omitted.

In some embodiments where the Bluetooth device set 102 does not need to play the audio data, the first audio playback circuit 162, the second audio playback circuit 172, and/or the third audio playback circuit 182 may be omitted.

In practice, the number of member devices in the Bluetooth device set 102 may be expanded to a larger number, or the Bluetooth device set 102 may be simplified to contain only the first member device 120 and the second member device 130.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A Bluetooth communication system (100), comprising:
a Bluetooth host device (110), comprising:
a host-side communication circuit (111);
a storage circuit (113), arranged to operably store a Bluetooth pairing program (117); and
a processing circuit (115), coupled with the host-side communication circuit (111) and the storage circuit (113), and arranged to operably execute the Bluetooth pairing program (117) in the storage circuit (113) to generate a first graphical user interface (700), and arranged to operably control a display device (150) to display the first graphical user interface (700); and
a Bluetooth device set (102), comprising at least a first member device (120) and a second member device (130);

wherein the first member device (120) comprises:
a first communication circuit (121), arranged to operably conduct wireless communications with the host-side communication circuit (111); and
a first control circuit (125), coupled with the first communication circuit (121), and arranged to operably utilize the first communication circuit (121) to transmit a first device information corresponding to the first member device (120) and a second device information corresponding to the second member device (130) to the Bluetooth host device (110);

wherein the second member device (130) comprises:
a second communication circuit (131), arranged to operably conduct wireless communications with the host-side communication circuit (111); and
a second control circuit (135), coupled with the second communication circuit (131), and arranged to operably control operations of the second communication circuit (131);

wherein the host-side communication circuit (111) is further arranged to operably receive the first device information and the second device information transmitted from the first member device (120);

wherein the processing circuit (115) is further arranged to operably utilize the host-side communication circuit (111) to automatically establish a first Bluetooth connection and conduct a pairing procedure with the first member device (120) to generate a first cypher key (Key-1) after receiving a selection command, and to operably use the first cypher key (Key-1) to conduct Bluetooth data transmission with the first member device (120) through the host-side communication circuit (111) so as to adopt BLE Audio technology to transmit a first audio data to the first member device (120);

wherein the first control circuit (125) is further arranged to operably utilize the first communication circuit (121) to establish the first connection and conduct a pairing procedure with the Bluetooth host device (110) to generate a second cypher key (Key-2) corresponding to the first cypher key (Key-1), and to operably use the second cypher key (Key-2) to conduct Bluetooth data transmission with the Bluetooth host device (110) through the first communication circuit (121) so as to receive the first audio data;

wherein the processing circuit (115) is further arranged to operably utilize the display device (150) to display a single device item (730) for representing a Bluetooth device set (102) to which the first member device (120) and the second member device (130) belong;

wherein the processing circuit (115) is further arranged to operably utilize the host-side communication circuit (111) to automatically establish a second Bluetooth connection and conduct a pairing procedure with the second member device (130) to generate a third cypher key (Key-3) after utilizing the display device (150) to display the device item (730), and to operably use the third cypher key (Key-3) to conduct Bluetooth data transmission with the second member device (130) through the host-side communication circuit (111) so as to adopt BLE Audio technology to transmit a second audio data to the second member device (130);

wherein the second control circuit (135) is further arranged to operably utilize the second communication circuit (131) to establish the second connection and conduct a pairing procedure with the Bluetooth host device (110) to generate a fourth cypher key (Key-4)

corresponding to the third cypher key (Key-3), and to operably use the fourth cypher key (Key-4) to conduct Bluetooth data transmission with the Bluetooth host device (110) through the second communication circuit (131) so as to receive the second audio data.

2. The Bluetooth communication system (100) of claim 1, wherein the processing circuit (115) is further arranged to operably control the display device (150) to display the device item (730) for representing the Bluetooth device set (102) in the first graphical user interface (700) after the host-side communication circuit (111) receives the first device information and the second device information transmitted from the first member device (120), but not to simultaneously display two device items for respectively representing the first member device (120) and the second member device (130) in the first graphical user interface (700).

3. The Bluetooth communication system (100) of claim 2, wherein the processing circuit (115) is further arranged to operably determine that the first member device (120) and the second member device (130) both belong to the Bluetooth device set (102) according to the first device information and the second device information transmitted from the first member device (120).

4. The Bluetooth communication system (100) of claim 1, wherein the processing circuit (115) does not utilize the display device (150) to display any device item for representing the second member device (130) in the first graphical user interface (700) before the processing circuit (115) utilizes the host-side communication circuit (111) to conduct the pairing procedure with the second member device (130).

5. A computer program product (117), stored in a storage circuit (113) in a Bluetooth host device (110), enabling the Bluetooth host device (110) to conduct a Bluetooth pairing operation, the Bluetooth pairing operation comprising:
  generating a first graphical user interface (700), and controlling a display device (150) to display the first graphical user interface (700);
  utilizing a host-side communication circuit (111) to receive a first device information corresponding to the first member device (120) and a second device information corresponding to a second member device (130) transmitted from a first member device (120);
  utilizing the host-side communication circuit (111) to establish a first Bluetooth connection and conduct a pairing procedure with the first member device (120) to generate a first cypher key (Key-1) after receiving a selection command;
  using the first cypher key (Key-1) to conduct Bluetooth data transmission with the first member device (120) through the host-side communication circuit (111) so as to adopt BLE Audio technology to transmit a first audio data to the first member device (120);
  utilize the display device (150) to display a single device item (730) for representing a Bluetooth device set (102) to which the first member device (120) and the second member device (130) belong;
  utilizing the host-side communication circuit (111) to automatically establish a second Bluetooth connection and conduct a pairing procedure with the second member device (130) to generate a third cypher key (Key-3) after utilizing the display device (150) to display the device item (730); and
  using the third cypher key (Key-3) to conduct Bluetooth data transmission with the second member device (130) through the host-side communication circuit (111) so as to adopt BLE Audio technology to transmit a second audio data to the second member device (130).

6. The computer program product (117) of claim 5, wherein the Bluetooth pairing operation further comprises:
  after the host-side communication circuit (111) receives the first device information and the second device information transmitted from the first member device (120), controlling the display device (150) to display the device item (730) for representing the Bluetooth device set (102) in the first graphical user interface (700) but not simultaneously displaying two device items for respectively representing the first member device (120) and the second member device (130) in the first graphical user interface (700).

7. The computer program product (117) of claim 6, wherein the Bluetooth pairing operation further comprises:
  determining that the first member device (120) and the second member device (130) both belong to the Bluetooth device set (102) according to the first device information and the second device information transmitted from the first member device (120).

8. The computer program product (117) of claim 5, wherein the Bluetooth pairing operation further comprises:
  not utilizing the display device (150) to display any device item for representing the second member device (130) in the first graphical user interface (700) before utilizing the host-side communication circuit (111) to conduct the pairing procedure with the second member device (130).

* * * * *